US008601052B2

(12) United States Patent
Mir et al.

(10) Patent No.: US 8,601,052 B2
(45) Date of Patent: Dec. 3, 2013

(54) SYSTEM AND METHOD OF PERFORMING DOMAIN NAME SERVER PRE-FETCHING

(75) Inventors: Idris Mir, San Diego, CA (US); Rajiv K. Vijayakumar, San Diego, CA (US); Samson Jim, San Diego, CA (US); Mark Bapst, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 12/897,553

(22) Filed: Oct. 4, 2010

(65) Prior Publication Data

US 2012/0084343 A1 Apr. 5, 2012

(51) Int. Cl.
G06F 15/16 (2006.01)
G06F 3/00 (2006.01)
H04L 29/08 (2006.01)

(52) U.S. Cl.
CPC .............................. *H04L 29/08072* (2013.01)
USPC ........... 709/203; 709/217; 709/219; 709/224; 709/245; 715/738; 715/760; 715/784

(58) Field of Classification Search
USPC .......... 709/203, 217–219, 245; 370/252, 349, 370/465; 455/414.1; 715/784; 725/52; 345/418, 660, 684
See application file for complete search history.

(56) References Cited

U.S. PATENT DOCUMENTS 7,222,356 B1 * 5/2007 Yonezawa et al. ............ 725/105
7,840,911 B2 * 11/2010 Milener et al. ................ 715/822
2003/0033384 A1 * 2/2003 Nishizawa et al. ........... 709/219
2005/0138143 A1 * 6/2005 Thompson .................... 709/218
2005/0198191 A1 * 9/2005 Carlson et al. ................ 709/217
2006/0069618 A1 * 3/2006 Milener et al. .................. 705/14
2006/0294223 A1 12/2006 Glasgow et al.
2007/0013708 A1 * 1/2007 Barcklay et al. .............. 345/557
2007/0213101 A1 * 9/2007 Oh et al. ........................ 455/572
2007/0226646 A1 * 9/2007 Nagiyama et al. ............ 715/784
2008/0228864 A1 * 9/2008 Plamondon ................... 709/203
2010/0049872 A1 * 2/2010 Roskind ........................ 709/245
2010/0144326 A1 * 6/2010 Wilhelmsson ............. 455/414.1
2012/0007876 A1 * 1/2012 Hymel .......................... 345/581
2012/0191862 A1 7/2012 Kovvali et al.
2012/0284372 A1 11/2012 Ghosh et al.
2013/0055395 A1 * 2/2013 Milener et al. ................. 726/24

OTHER PUBLICATIONS

International Search Report and Written Opinion—PCT/US2011/049843—ISA/EPO—Jan. 11, 2012.

(Continued)

Primary Examiner — Wing F Chan
Assistant Examiner — Raji Krishnan
(74) Attorney, Agent, or Firm — Nicholas A. Cole

(57) ABSTRACT

A method and system for performing domain name service (DNS) pre-fetching, content pre-fetching, or a combination thereof, are disclosed for a wireless portable computing device (PCD). The system and method may include rendering a web page on a display screen of the PCD and performing a DNS pre-fetch for any visible links within the web page. Further, the method may include determining whether a screen changing operation (i.e., a scrolling operation) is being performed and placing one or more DNS pre-fetch tasks in a queue for each link that is displayed on the display screen when the screen changing operation is performed. The method and system may reduce wait times for a wireless PCD when it is rendering webpages on its display screen.

32 Claims, 14 Drawing Sheets

(56) References Cited

OTHER PUBLICATIONS

Siegel, Brandon, "DNS Prefetch 1.1.0", Webpage located at https://addons.mozilla.org/en-US/firefox/addon/dns-prefetch downloaded Dec. 7, 2012, Apr. 13, 2009, Publisher: Mozilla Published in: US, pp. 3.

"The Chromium Projects", webpage located at http://dev.chromium.org/developers/design-documents/dns-prefetching downloaded Dec. 7, 2012, Publisher: Google Sites, Published in: US, pp. 4.

* cited by examiner

FIG. 6

SYSTEM AND METHOD OF PERFORMING DOMAIN NAME SERVER PRE-FETCHING

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. Many of these portable computing devices include a web browser which may allow a user to access the Internet in order to download content, view content, etc. Typically, when a user inputs a uniform resource locator (URL) into a web browser, a DNS lookup is performed for the URL and a transmission control protocol (TCP) connection may be established. Thereafter, a main HTML file, or main resource, may be received from the host server for the URL. The main HTML file may point the web browser to one or more additional host servers in order to request and obtain one or more sub-resources. The process for performing DNS lookups for the additional host servers and establishing TCP connections may be substantially slow and may require a substantial amount of overhead.

Accordingly, what is needed is an improved system and method of performing DNS pre-fetching, content pre-fetching, or a combination thereof.

BRIEF DESCRIPTION OF THE DRAWINGS

In the figures, like reference numerals refer to like parts throughout the various views unless otherwise indicated.

FIG. 6 is a view of a PCD display showing a second portion of a web page;

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
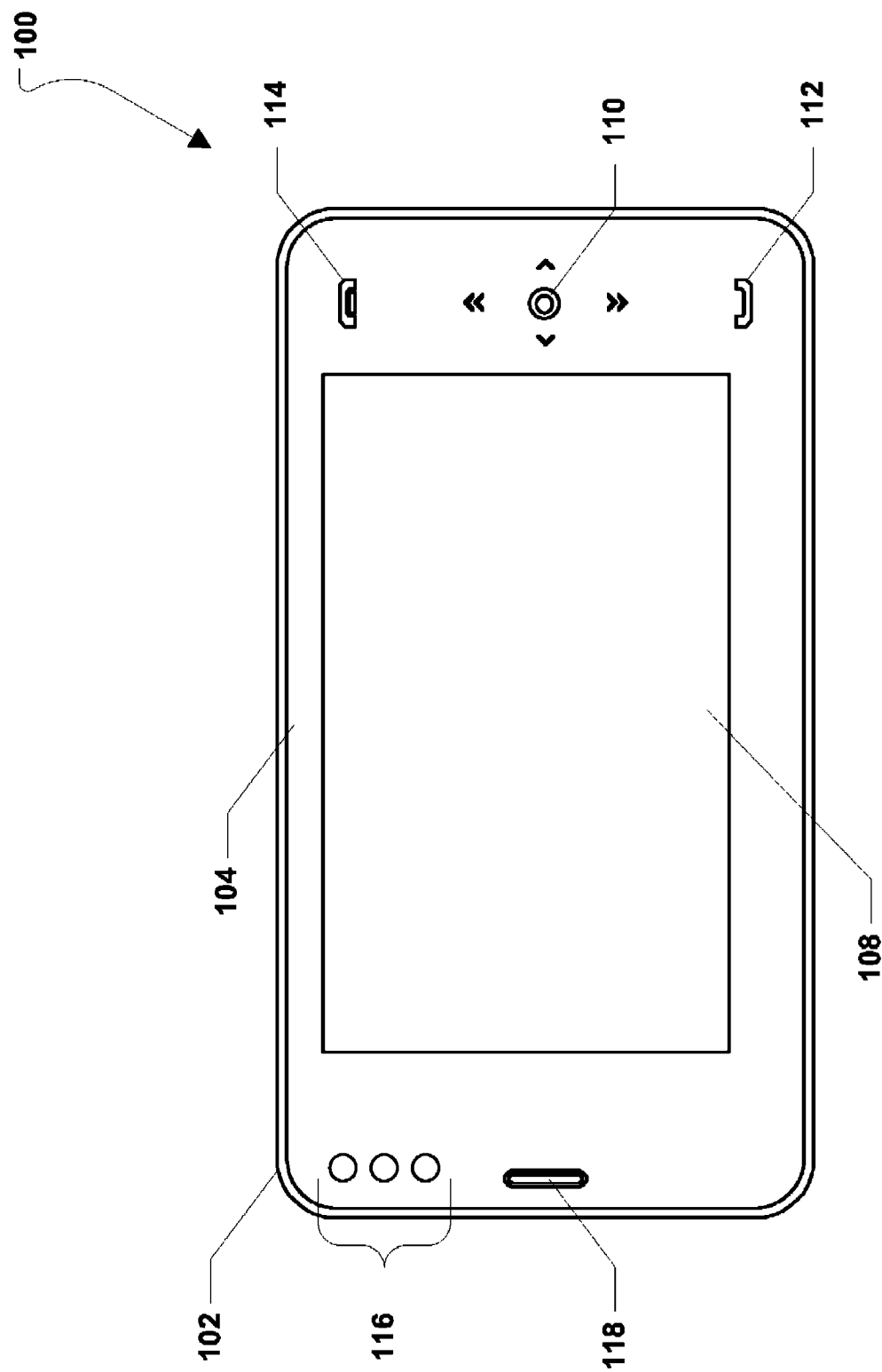
FIG. 1 is a front plan view of a first aspect of a portable computing device (PCD) in a closed position.
Figure 2:
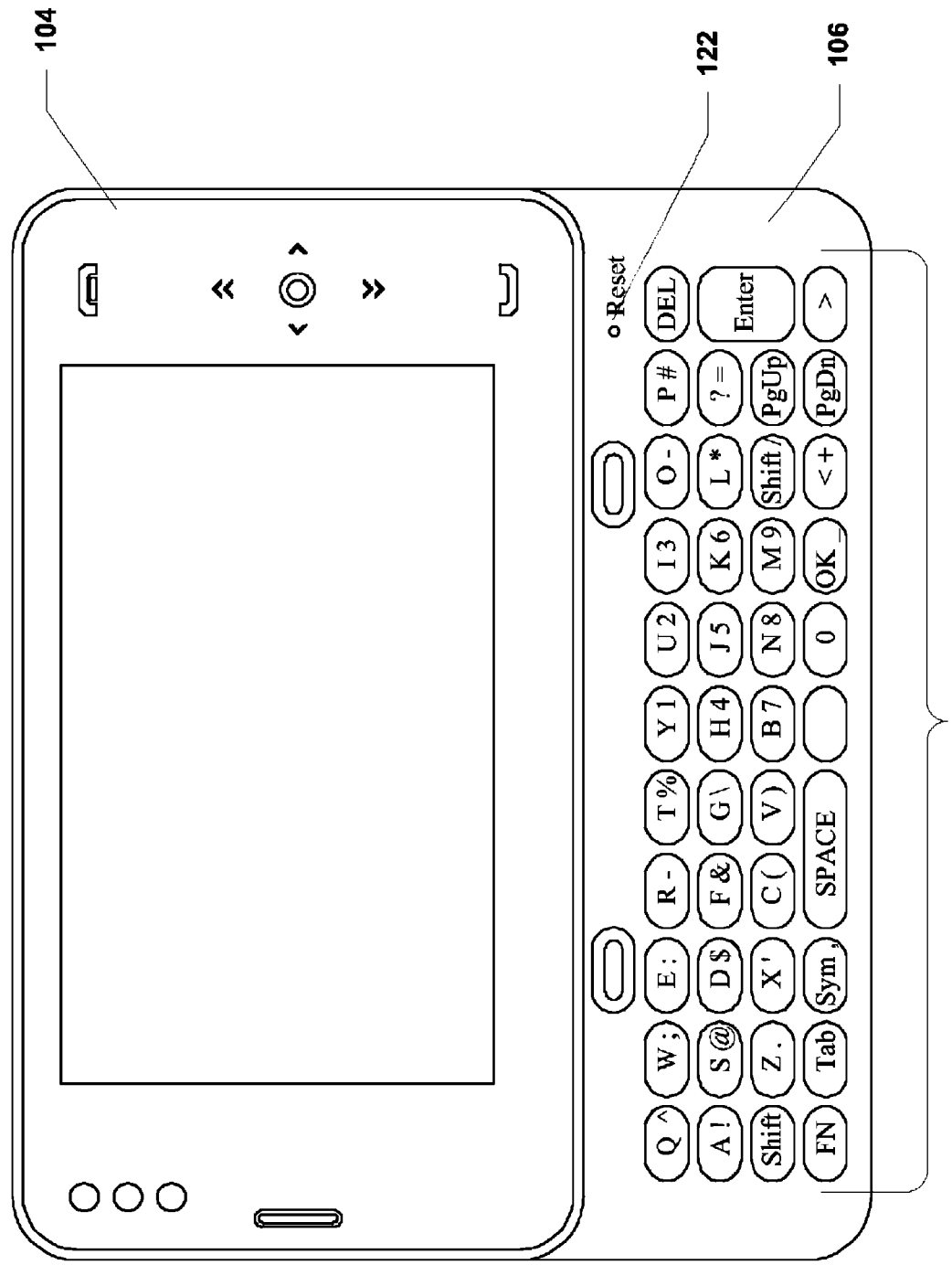
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3A:
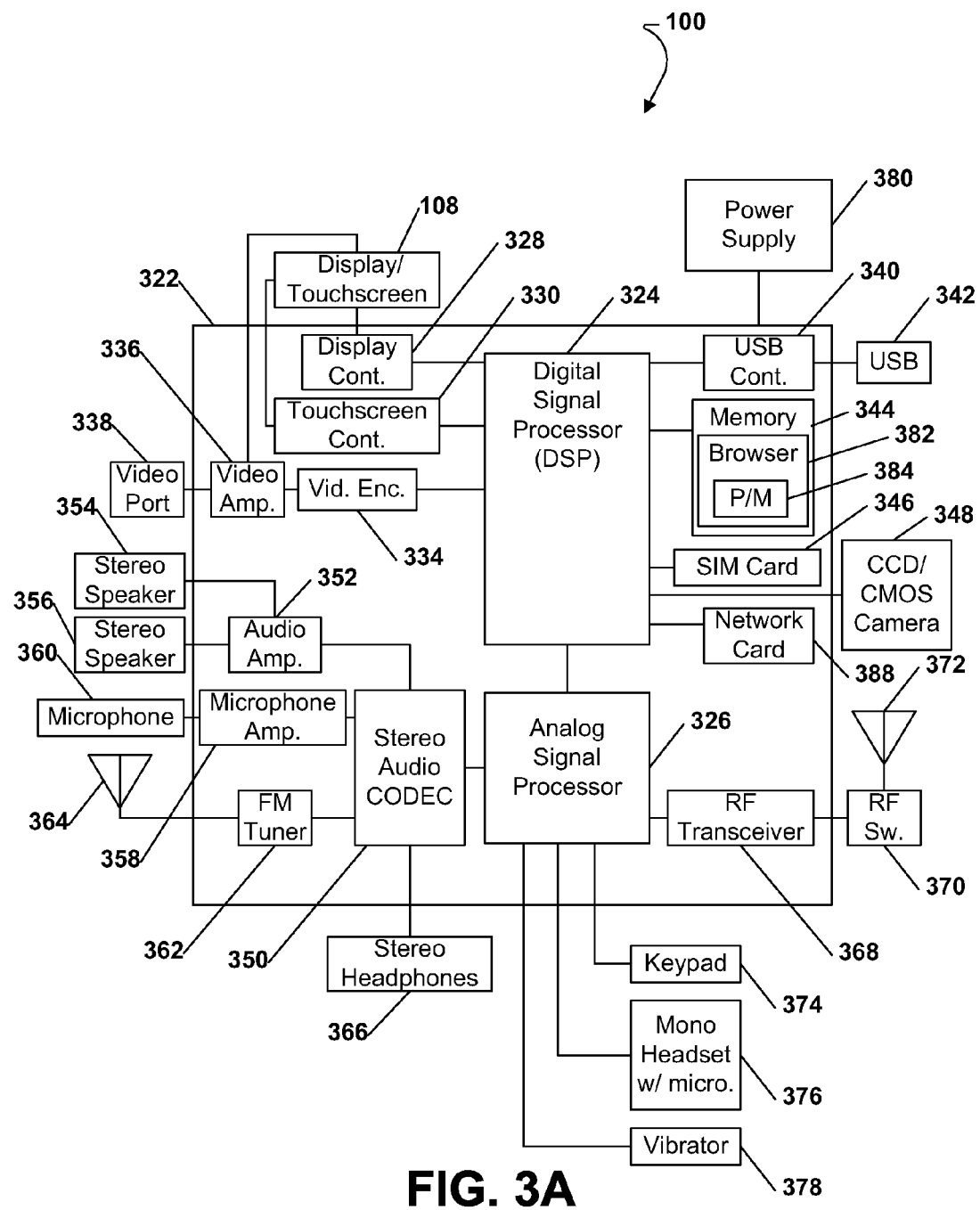
FIG. 3A is a block diagram of a first aspect of a PCD.

Referring to FIG. 3A, an exemplary, non-limiting aspect of a portable computing device (PCD) is shown and is generally designated 100. As shown, the PCD 100 includes an on-chip system 322 that includes a digital signal processor 324 and an analog signal processor 326 that are coupled together. The digital signal processor 324 may comprise a single processor or a plurality of processors. The digital signal processor 324 may also comprise a multi-core processor as understood by one of ordinary skill in the art.

The on-chip system 322 may include more than two processors. For example, the on-chip system 322 may include a plurality of core processors that form the digital signal processor (DSP) 324 as described below. As illustrated in FIG. 3A, a display controller 328 and a touch screen controller 330 are coupled to the digital signal processor (DSP) 324. In turn, a touch screen display 108 external to the on-chip system 322 is coupled to the display controller 328 and the touch screen controller 330.

FIG. 3A further indicates that a video encoder 334, e.g., a phase alternating line (PAL) encoder, a sequential couleur a memoire (SECAM) encoder, or a national television system(s) committee (NTSC) encoder, is coupled to the digital signal processor 324. Further, a video amplifier 336 is coupled to the video encoder 334 and the touch screen display 108. Also, a video port 338 is coupled to the video amplifier 336. As depicted in FIG. 3A, a universal serial bus (USB) controller 340 is coupled to the digital signal processor 324. Also, a USB port 342 is coupled to the USB controller 340. A memory resource 119 and a subscriber identity module (SIM) card 346 may also be coupled to the digital signal processor 324. Further, as shown in FIG. 3A, a digital camera 348 may be coupled to the digital signal processor 324. In an exemplary aspect, the digital camera 348 is a charge-coupled device (CCD) camera or a complementary metal-oxide semiconductor (CMOS) camera.

As further illustrated in FIG. 3A, a stereo audio CODEC 350 may be coupled to the analog signal processor 326. Moreover, an audio amplifier 352 may coupled to the stereo audio CODEC 350. In an exemplary aspect, a first stereo speaker 354 and a second stereo speaker 356 are coupled to the audio amplifier 352. FIG. 3A shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3A further illustrates that a radio frequency (RF) transceiver 368 may be coupled to the analog signal processor 326. An RF switch 370 may be coupled to the RF transceiver 368 and an RF antenna 372. As shown in FIG. 3A, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3A also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3A further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

FIG. 3A shows that the PCD 100 may also include a web browser application 382 that may be stored within the memory resource 119. The web browser application 382 may be used to search the Internet, access online content, download movies, download music, view movies, or a combination thereof. Further, the web browser application 382 may include a pre-fetch module (P/M) 384, e.g. as a plug-in. It may be appreciated that the pre-fetch module 384 may also be a separate application that interacts with the web browser 382 as described herein.

As depicted in FIG. 3A, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory resource 119 as computer program instructions, e.g., as part of the web browser application 382, the pre-fetch module 384, or a combination thereof. These instructions may be executed by a processor 324, 326 in order to perform the methods described herein. Further, the processors 324, 326, the memory resource 119, the web browser application 382, the pre-fetch module 384, or a combination thereof may serve as a means for executing one or more of the method steps described herein in order to perform domain name server (DNS) pre-fetch, content pre-fetch, or a combination thereof.

Figure 3B:
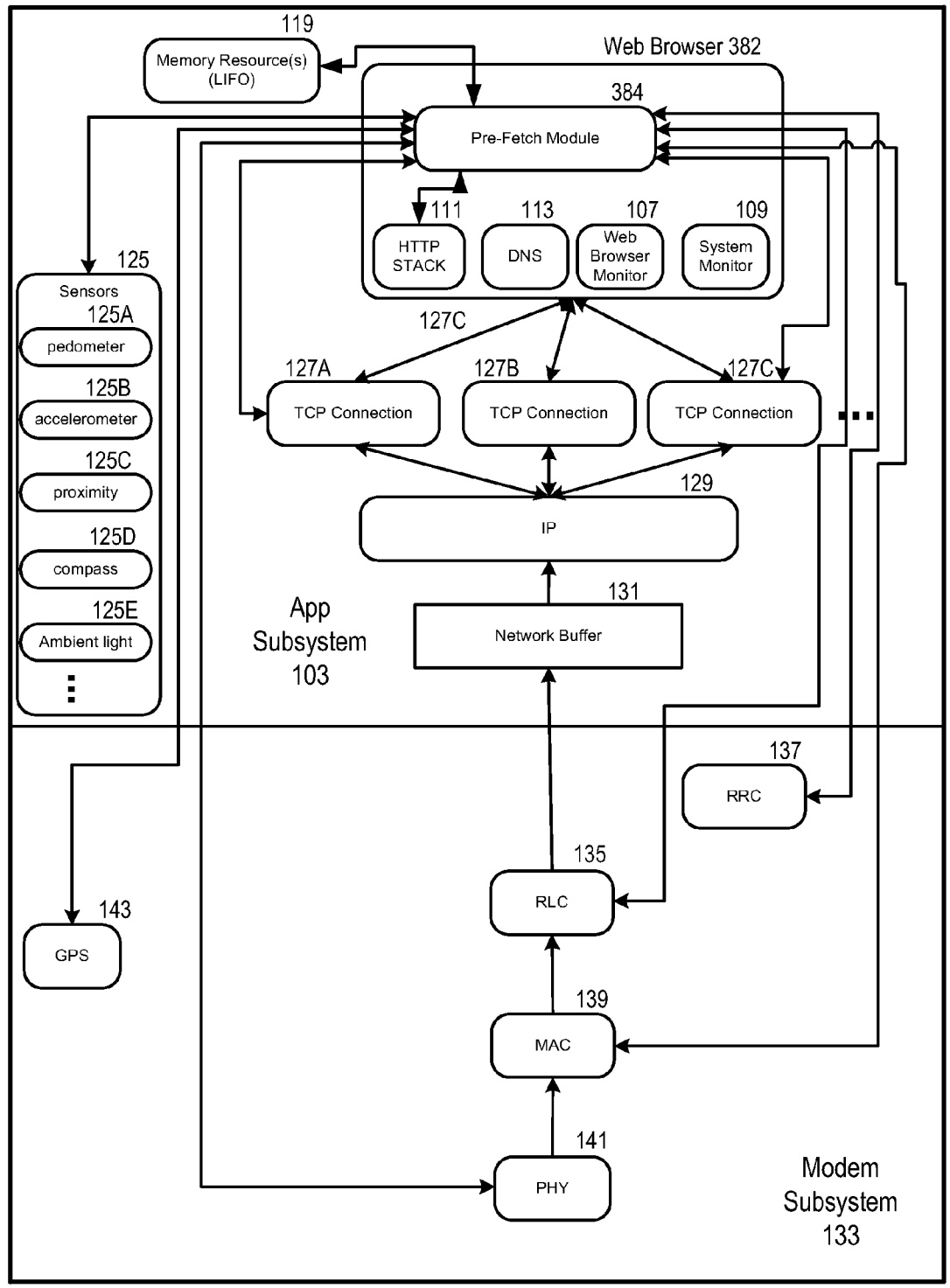
FIG. 3B is a diagram of a first aspect of a software architecture for a system that pre-fetches information for a wireless portable computing device.

FIG. 3B is a diagram of a first aspect of a software architecture for a system 103 that pre-fetches information for a wireless portable computing device 100. The application subsystem 103 may comprise a mobile web browser application 382 that is executed by a central processing unit 324 (see FIG. 3A) and which may support webpages rendered by the pre-fetch module 384.

The mobile web browser application or module 382 may communicate with transfer communication protocol ("TCP") modules 127 that reside over an Internet protocol ("IP") layer 129 as understood to one of ordinary skill in the art and described below.

The IP layer 129 communicates with a network buffer layer 131 as understood by one of ordinary skill the art. The IP layer 129 communicates with a modem subsystem 133, which is executed by a second central processing unit 326 (see FIG. 3).

The mobile web browser module 382 includes a pre-fetch module 384, a HTTP stack 111, a web browser monitor 107, a system monitor 109, and a domain name server module 113. While illustrated as included within the web browser module 382, in a further alternative exemplary embodiment (not illustrated), the pre-fetch module 384 may reside as a separate module relative to web browser 382.

The web browser monitor 107 may maintain a web browsing history. The web browsing history may include data regarding all pages viewed by a user, the time each page was viewed by the user, the date each page was viewed, or a combination thereof.

The system monitor 109 may determine a CPU/bus load, i.e., the current processor load. The CPU/bus load may be expressed as a processor speed, e.g., a processor frequency. The system monitor may also check on the status of power conditions, such as the status of the power supply 380, like a battery.

The mobile web browser module 382 may be coupled to a memory resource 119. The memory resource 119 may include, but is not limited to, a cache, random access memory ("RAM"), flash memory, a Secure Digital ("SD") memory card, and any combination thereof. The memory resource 119 may also comprise a last-in first-out (LIFO) queue as understood by one of ordinary skill in the art.

The pre-fetch module 384 may be responsible for controlling or instructing the web browser 382 on what file segments, such as web pages, should be downloaded next to the portable computing device 100 to insure optimal video playback quality for the computing device 100. The pre-fetch module 384 may be dynamic in that it may continually monitor elements of the application subsystem 103 as well as the modem subsystem 133. Further, the pre-fetch module 384 may also receive messages from elements within the application subsystem 103 and the modem subsystem 133.

The DNS module 113 of the web browser 382 may be responsible for translating the text based domain names into the numeric Internet protocol (IP) address as understood by one of ordinary skill the art. The DNS module 113 may communicate the IP address back to the HTTP stack 111 which in turn relays it to the TCP connection module 127.

When the HTTP stack 111 returns a meta-object, such as a web page, from the TCP connection module 127, the HTTP stack module 111 relays this meta-object to the pre-fetch module 384. The http stack module 111 may also provide the client pre-fetch module 384 with certain status information. The status information may include, but is not limited to: high speed-schedule control channel ("HS-SCCH") Valid status; high speed transport block size ("HS-TBS"); layer one block error rates ("L1 BLER"); radio link control protocol data unit ("RLC PDU") size; radio link control down link service data unit ("RLC DL SDU") Byte received ("Rx"); high speed downlink packet access ("HSDPA") user equipment ("UE") Category; media access control uplink buffer status report ("MAC UL BSR"); enhanced uplink transmission time interval ("EUL TTI"); enhanced transport format combination index ("ETFCI") table index; ETCFI; the number of new transmissions ("Tx"); radio link control uplink service data unit ("RLC UL SDU") Byte transmission ("Tx"); diversity transmission/diversity reception ("DTX/DRX") mode; enhanced uplink user equipment ("EUL UE") category; media access control transmission layer transport block size ("MAC TL TBS"); packet data convergence protocol downlink service data unit ("PDCP DL SDU") Byte reception ("Rx"); media access control uplink transport block size ("MAC UL TBS"); packet data convergence protocol uplink service data unit ("PDCP UL SDU") Byte transmission ("Tx"); and user equipment category ("UE Category").

The pre-fetch module 384 may be responsible for parsing and/or reviewing the meta-object, such as a web page 500 and its related hypertext links 502, 504, 602, 604, and deciding which links 502, 504, 602, 604 are appropriate for the next download after assessing the current wireless network conditions and the operating environment of the portable computing device 100.

The Transport Control Protocol ("TCP") connection module 127 operates in the Transport Layer of the Open Systems Interconnection ("OSI") model of general networking as understood by one of ordinary skill in the art. The TCP connection module 127 is responsible for encapsulating application data blocks into data units (datagrams, segments) suitable for transfer to the network infrastructure for transmission to the destination host, or managing the reverse transaction by abstracting network datagrams and delivering their payload to the mobile web browser 382.

The TCP connection modules 127 may provide information that includes, but is not limited to, re-transmission time out ("RTO"); advertised receiver window ("Rx Window"); transmission-receiver throughput ("Tx/Rx Throughput"); packet statistics; a total number of TCP connections; estimated round-trip time ("RTT"); number of bytes received; the number of in sequence packets; and the TCP transmitting window size.

The Internet Protocol ("IP") module 129 communicates with the TCP connection module 127 and the network buffer layer 131. The IP module 129 has the task of delivering distinguished protocol datagrams (packets) from the mobile web browser to the server based on their addresses. The IP module 129 defines addressing methods and structures for datagram encapsulation. The IP module 129 may utilize Internet Protocol Version 4 ("IPv4") as well as Internet Protocol Version 6 ("IPv6"), which is being deployed actively as of this writing. However, other versions of the Internet protocol, including future ones not yet developed, are included within the scope of the invention.

The network buffer layer 131 communicates with the IP module 129 and the modem subsystem 133. The network buffer layer 131 may contain all hardware specific interface methods, such as Ethernet and other IEEE 802 encapsulation schemes. The network buffer layer 131 may probe the topology of a local network, such as the communications network 206. It may discover routers and neighboring hosts, and it may be responsible for discovery of other nodes on the link. The network buffer layer 131 may determine the link layer addresses of other nodes, find available routers, and maintaining reachability information about the paths to other active neighbor nodes.

The pre-fetch module 384 may communicate with the http stack 111 as well as the TCP modules 127. The pre-fetch module 384 also communicates with one or more sensors 125. The sensors 125 may include, but are not limited to, pedometer 125A, an accelerometer 125B, a proximity sensor 125C, a compass 125D, and an ambient light sensor 125E. The pedometer 125A may provide signals that indicate that the portable computing device 100 is being used by a person who is walking The accelerometer 125B may provide signals that indicate that the portable computing device 100 is located in a motorized vehicle, such as an automobile. The proximity sensor 125C may indicate if the portable computing device 100 is positioned next to a person's face for conducting a telephone call. The compass 125D may provide signals that indicate a specific direction in which the portable computing device 100 is traveling. And the ambient light sensor 125E may provide signals to indicate if the portable computing device 100 is being used in a light or dark environment, which impacts how videos may need to be displayed on the computing device 200.

The modem subsystem 133 may comprise a radio link control ("RLC") layer 135, a media access control ("MAC") layer 139, a physical ("PHY") layer 141, a radio-relay control ("RRC") module 137, and a global positioning system ("GPS") 143. These elements of the modem subsystem 133 may be responsible for communicating with communications hardware such as the RF transceiver 368 as illustrated in FIG. 2.

Each of the elements of the modem subsystem 133 may send messages or receive queries from the pre-fetch module 384. For example, the RRC module 137 may communicate information such as, but not limited to, high speed downlink packet access ("HSDPA") category information, enhanced uplink layer ("EUL") category information, and discontinuous reception/transmission ("DRX/DTX") configuration ("Config") information.

The RLC module 135 may communicate throughput as well as radio link control ("RCL") protocol data unit ("PDU") size to the pre-fetch module 384. The MAC layer 139 may communicate uplink ("UL") information, such as, but not limited to, buffer status report ("BSR") information and enhanced dedicated channel ("EDCH") transport format ("TF") information. The physical layer 141 may communicate the downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 141 may also communicate uplink ("UL") information, such as, but not limited to, BLER, modulation, and transmitter ("Tx") automatic gain control ("AGC").

The RRC module 137, RLC module 135, MAC module 139, and PHY module 141, may form an evolved high-speed packet access system 177 ("HSPA") as is understood to one of ordinary skill the art. Meanwhile, the GPS module 143 may provide information, such as, but not limited to, location, and speed or velocity of the portable computing device 100 to pre-fetch module 384.

By monitoring elements of the application subsystem 103 and the modem subsystem 133, the pre-fetch module 384 may allow the wireless portable computing device 200 to intelligently select web pages that will likely be viewed by the operator of the PCD 100 by monitoring wireless network conditions as well as conditions of the portable computing device 200 itself. The pre-fetch module 384 may determine the size and type of web pages that it should load by using the monitored conditions to determine what is the appropriate bit rate for a web page to be downloaded from the server.

Some of the monitored conditions based upon the data provided by the application subsystem 103 and the modem subsystem 133 include, but are not limited to: memory conditions, including the size of the current buffer and the rate at which the buffer's growing are being consumed by the computing device 200; current and historical WWAN bandwidth; current and historical WWAN signal strength; number of IP socket data connections available; estimation of an overall video clip length and then estimating each uniform resource locator ("URL") download time for each file segment for a web page based on signal-noise-ratio history/histogram and location based service ("LBS"); rate of speed of the portable computing device 100 which is calculated by either cell tower identification triangulation or precise latitude longitude through the use of location-based technologies such as the GPS module 143; and the direction of travel of the portable computing device 100 using an accelerometer and/or the LBS.

The pre-fetch module 384 may calculate a predetermined time period in which the pre-fetch module 384 must maintain or use a lower bit rate until the signal-to-noise ratio stays high and/or the BLER stays low continuously. The pre-fetch module 384 may also turn "on" or turn "off" any type of receive diversity function(s) in the modem subsystem 133 in order to minimize power during ideal network situations, such as when the portable computing device 100 is stationary, or when the portable computing device 100 is operating under relatively low-speed conditions, such as when a user is walking with the computing device 100.

System and Method Overview

In a particular aspect, a DNS pre-fetch may include, but is not limited to, the pre-fetch module 384 identifying and retrieving a domain name prior to a user generating a request for a domain name. A DNS pre-fetch may further include opening one or more transmission control protocol (TCP) sockets, or connections, to a host server before a hyper text transfer protocol (HTTP) request is issued, such as before a HTTP request generated by the web browser 382 in response to a selection made by a user of the browser 382. A content pre-fetch may include, but is not limited to, the pre-fetch module 384 downloading a page, conditional content, other content, or a combination thereof before a user actually requests the page, conditional content, etc.

On a mobile device, e.g., a PCD 100, wireless network latencies are usually more pronounced compared to desktops operating within a wired network. CPU resources for PCDs 100 are also usually more limited than those of a desktop, or laptop, computer. In some wireless wide area network (WWAN) coverage areas, uplink resources may be substantially limited, e.g. to lower speeds on the order of 4 kbps, as a mere example. These limitations of PCDs 100 used in wireless network environments are some of the problems being solved by a web browser 382 provided with the pre-fetch module 384 disclosed herein.

Figure 4:
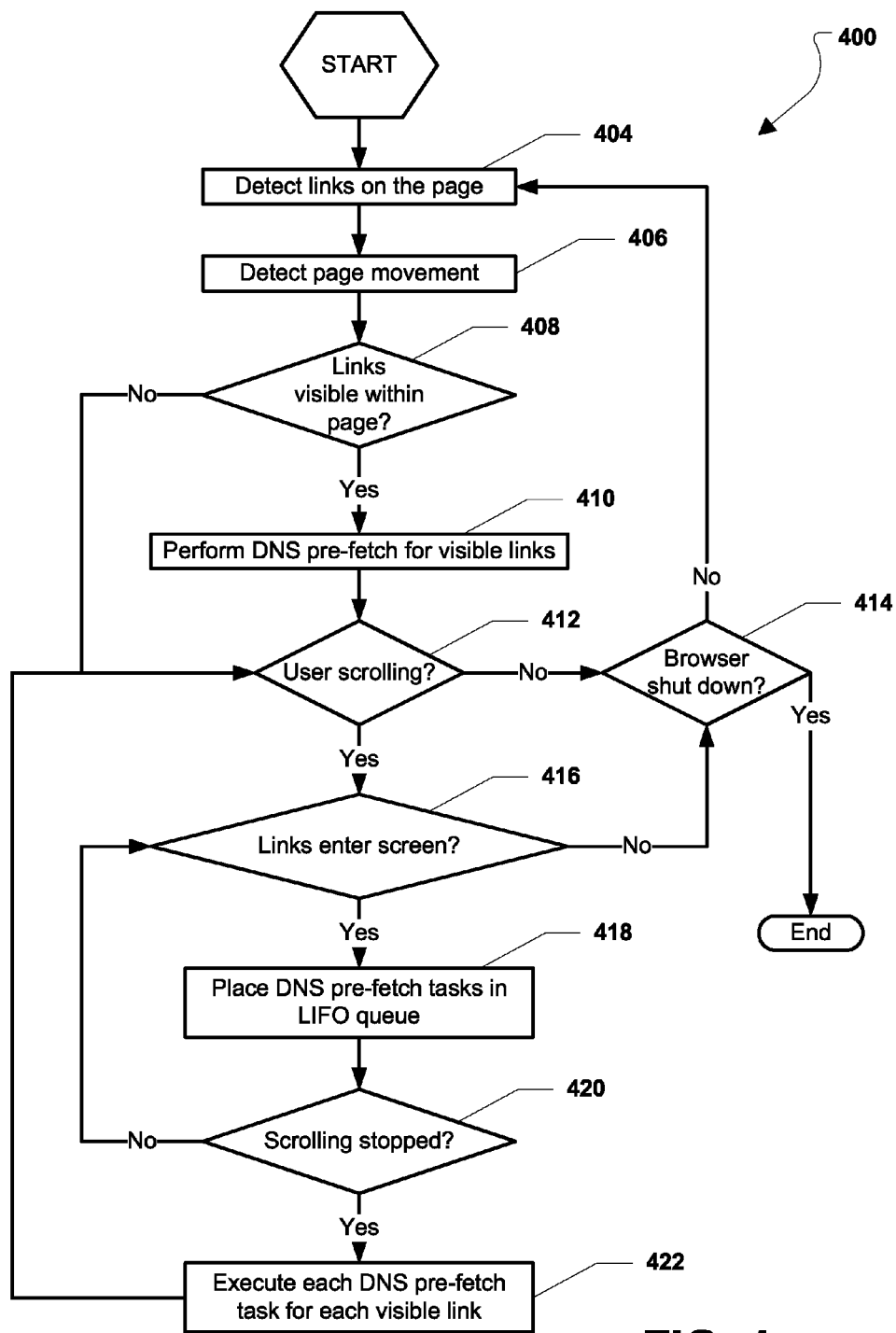
FIG. 4 is a flowchart illustrating a method of performing DNS pre-fetching.

Referring to FIG. 4, a method of performing DNS pre-fetching is shown and is generally designated 400. Beginning at block 404, a web browser application 382 may detect links on the rendered page. Further, at block 406, the web browser application 382 may detect page movement.

Moving to decision block 408, the pre-fetching module 382 may determine whether any links are visible within the page. If so, the method 400 may proceed to block 410 and the pre-fetching module 382 may perform a DNS pre-fetch for any visible link on the web page. Then, the method 400 may proceed to decision block 412.

Returning to decision block 408, if the pre-fetching module 382 determines that there are not any links visible on the rendered page, the method 400 may proceed directly to decision block 412. At decision block 412, the pre-fetching module 382 may determine whether a user is changing screen content, i.e., whether a scrolling, panning, and/or zooming operation is being performed. If not, the method 400 may move to decision block 414 and pre-fetching module 382 determine whether the web browser application is shut down. If the web browser application is shut down, the method 400 may end. Otherwise, if the web browser application is not shut down, i.e., it continues to execute or run, then the method 400 may return to block 404 and the method 400 may continue as described herein.

Returning to decision block 412, if the user is changing screen content (such as scrolling), the method 400 may move to decision block 416 and the pre-fetching module 382 may determine whether any links have entered the screen. If not, the method 400 may continue to decision block 414 and the method 400 may then continue as described herein. If links have entered the screen, i.e., the viewing area of a display, the method 400 may move to block 418 and the pre-fetching module 382 may place a DNS pre-fetch task in a last in first out (LIFO) queue 119. Thereafter, the method 400 may proceed to decision block 420 and the pre-fetching module 382 may determine whether the screen changing operation has stopped. If the screen changing operation is not stopped, the method 400 may return to decision block 416 and the method 400 may continue as described herein. Otherwise, if the screen changing operation is stopped, the method 400 may proceed to block 422 and pre-fetching module 382 may execute each DNS pre-fetch task for each visible link within the display 108. Then, the method 400 may return to decision block 412 and the method 400 may continue as described.

The method 400 shown in FIG. 4 may limit pre-fetching only for links that are likely to be clicked on immediately or fall within the immediately rendered page. As the user scrolls the page, new DNS pre-fetch requests can be generated by the pre-fetching module 382 for links that come into view.

Figure 5:
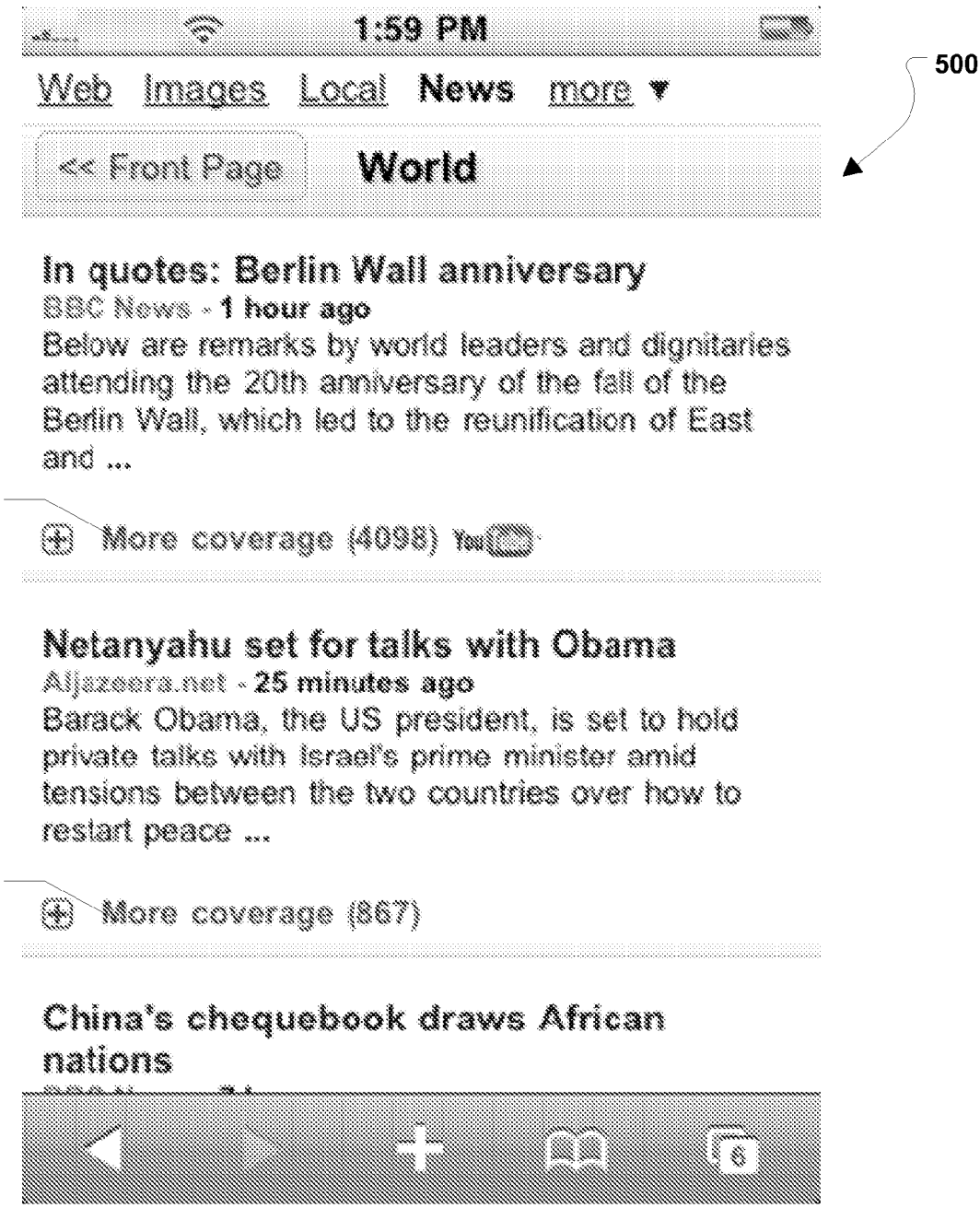
FIG. 5 is a view of a PCD display showing a first portion of a web page.
Figure 6:
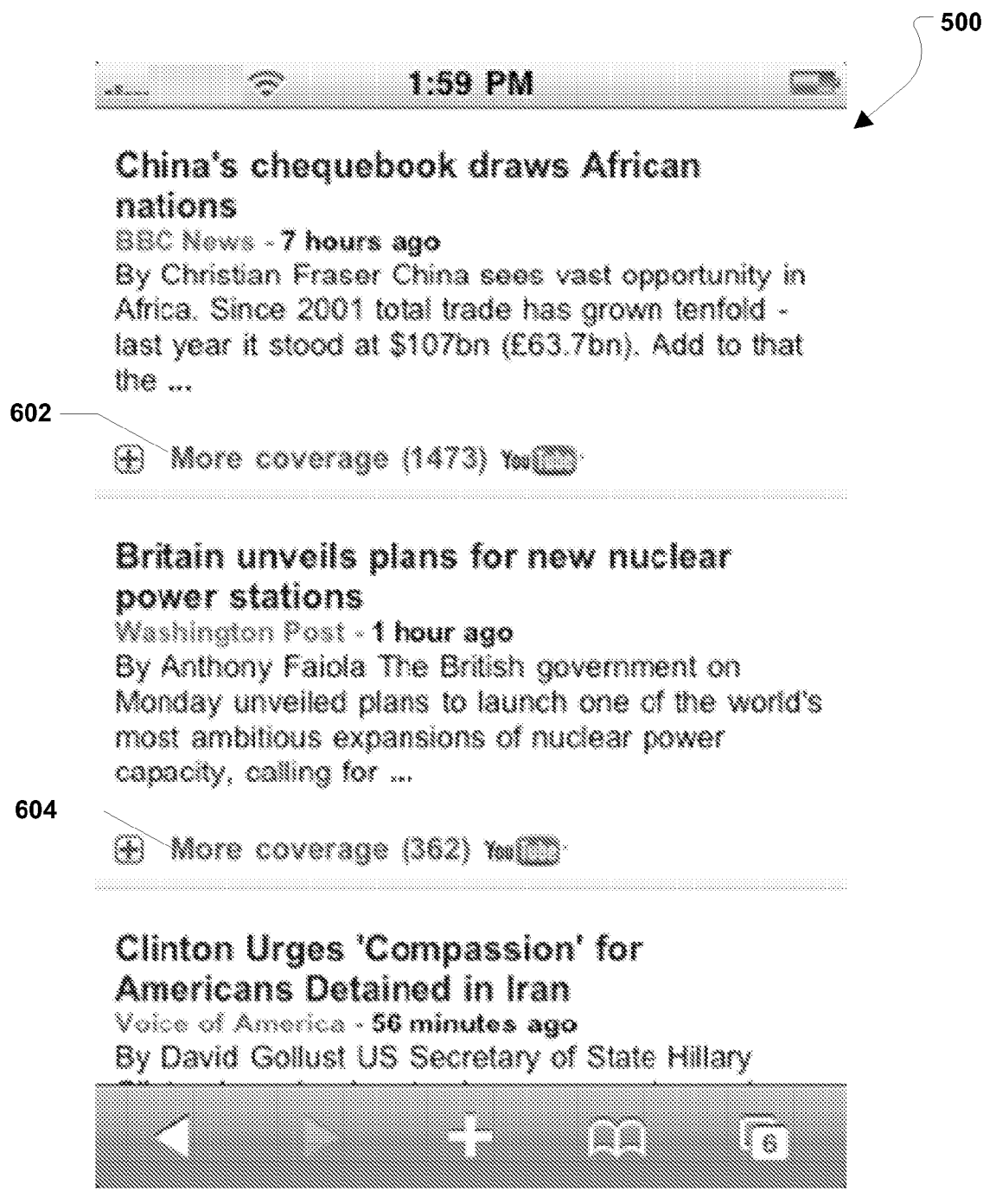

FIG. 5 and FIG. 6 depict an exemplary web page, designated 500. In FIG. 5, the web page 500 includes a first more coverage link 502 and a second more coverage link 504. When the web page 500 is rendered initially, DNS pre-fetching may be performed for both "more coverage" links 502, 504. Accordingly, if a user clicks on either "more coverage" link 502, 504. The content, or page, associated with the "more coverage" link 502, 504 may be displayed to the user in a short amount of time. Further, when a user scrolls down on the web page, as shown in FIG. 6, a third "more coverage" link 602 and a fourth "more coverage" link 604 may be displayed to the user. Again, once the "more coverage" links 602, 604 come into view, DNS pre-fetching may be performed and if a user clicks on either of the "more coverage" links 602, 604, the content, or page associated with the "more coverage" links 602, 604 may be displayed to the user in a very short amount of time since the pre-fetch module 384 may open one or more transmission control protocol (TCP) sockets, or connections, to a host server before the user clicks on any of the "more coverage" links 602, 604 visible within the display 108.

Further, since it is possible for a user to pan or scroll through a page from top to bottom very quickly, a large number of DNS pre-fetch tasks could easily be queued up and stored in the LIFO queue 119 by the pre-fetch module 384 and once the user has stopped the screen changing operation, the DNS pre-fetch tasks may be performed by the pre-fetch module 384 for any visible links. Given the characteristics of a mobile device, e.g., relatively longer latencies and limited CPU resources when compared to a desktop computer or a laptop computer, if the user scrolls past a view region where some DNS pre-fetches were queued up and still reside in the LIFO queue 119, it may be advantageous for the pre-fetch module 384 to re-prioritize those older elements versus newer elements in the viewable region.

If CPU resources, network resources, or a combination thereof are marginally available, it may be appropriate to remove elements from the LIFO queue 119 altogether. On a high resolution small screen handheld display 108, the user will typically zoom, pan and scroll the portion of the web page they want to view. Utilizing the LIFO queue 119 may allow the DNS queuing task priority executed by the pre-fetch module 384 to more accurately stay in sync with the zoom, pan and scroll user activated features. The LIFO queue 119 may be emptied or flushed of its content if the pre-fetch module 384 determines that a user in not interested in the current DNS pre-fetches stored in the LIFO queue 119. The pre-fetch module may make this determination based on activities of the user such as if the user scrolls significantly far away relative to the links on a same webpage which were loaded into the LIFO queue 119. If a user navigates to another webpage, then this condition detected by the pre-fetch module 384 may also cause the pre-fetch module 384 to purge the contents of the LIFO queue 119.

Figure 7:
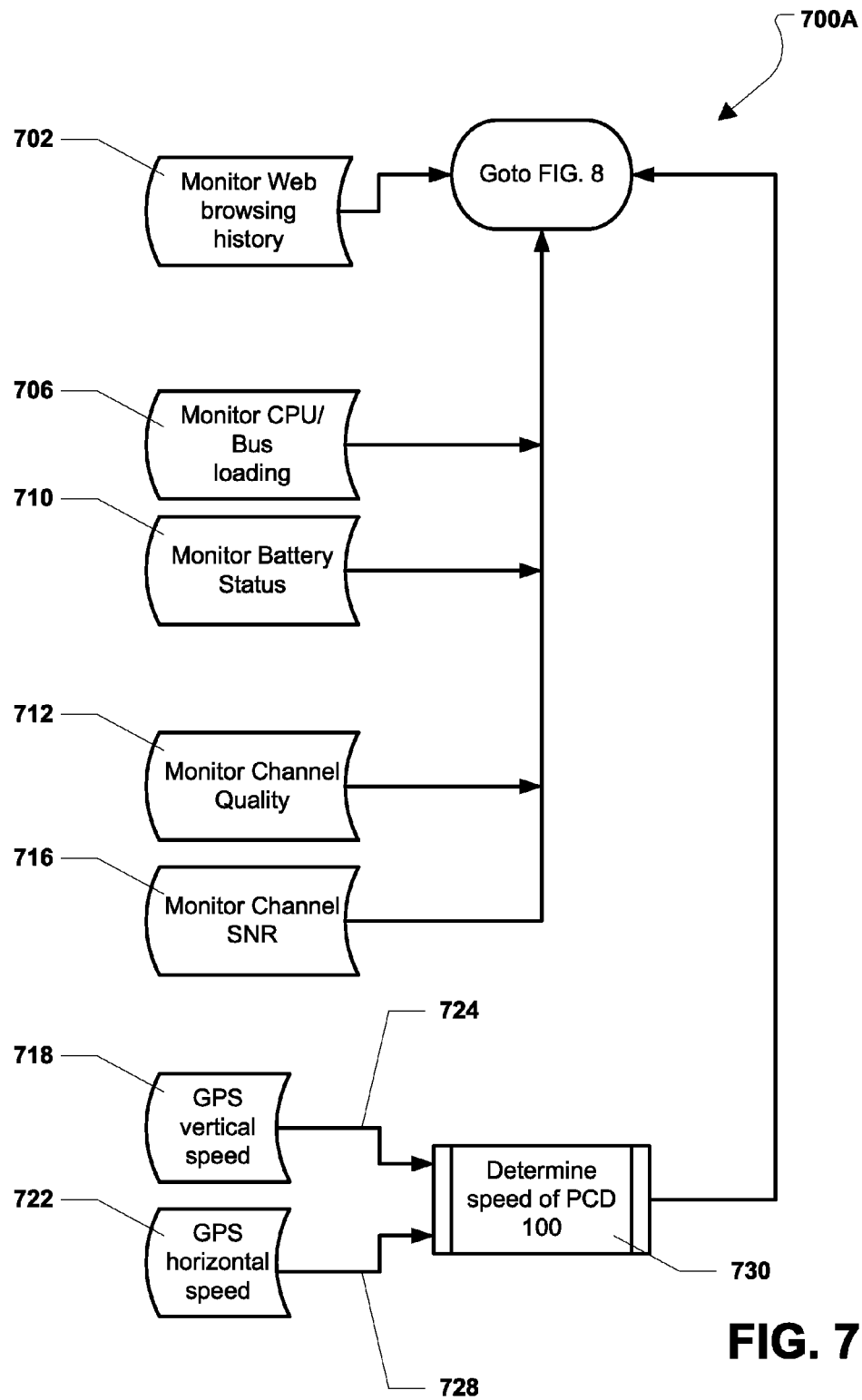
FIG. 7 is a first portion of a flowchart illustrating a first aspect of a method of performing content pre-fetching.
Figure 8:
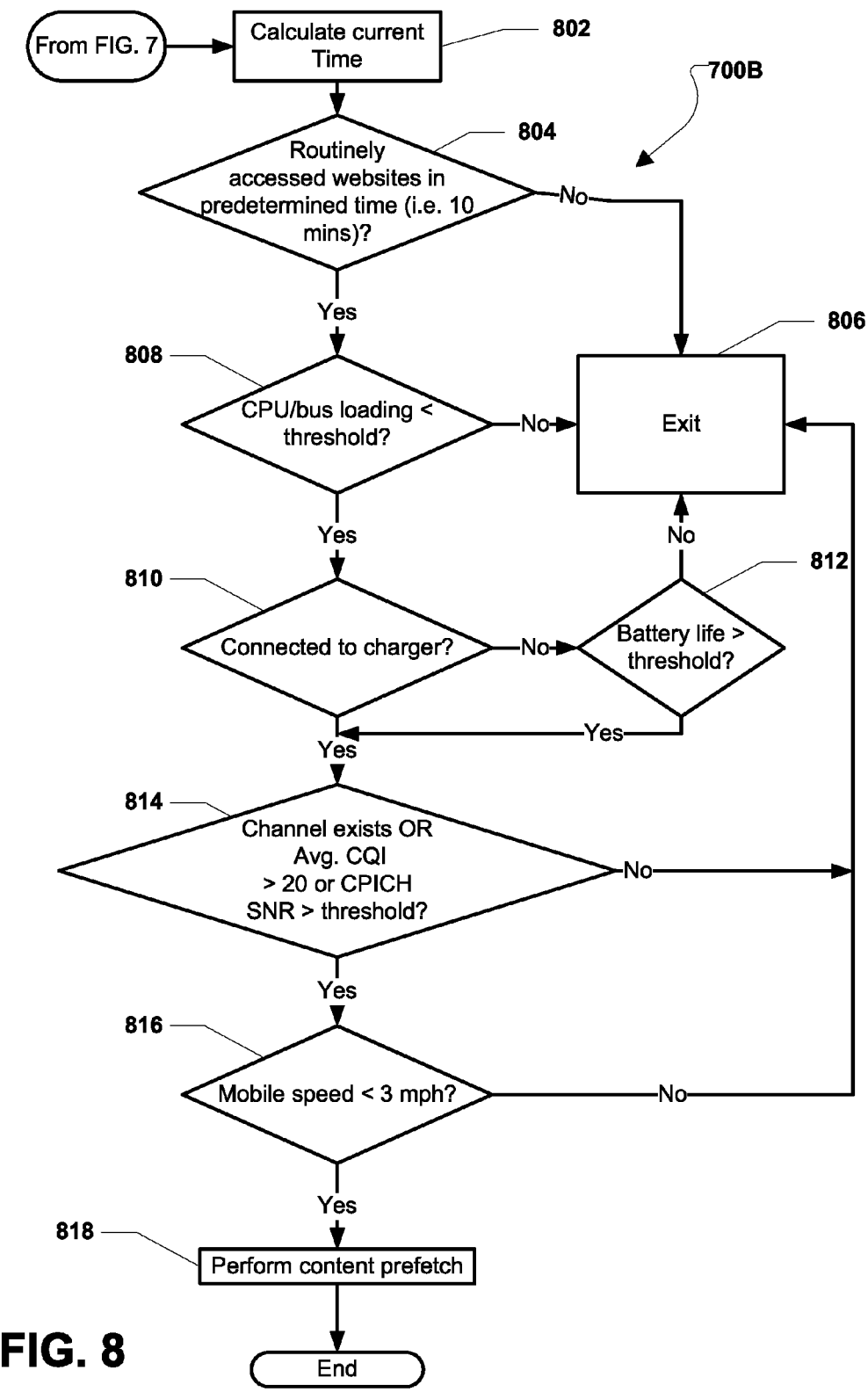
FIG. 8 is a second portion of the flowchart illustrating a first aspect of a method of performing content pre-fetching.

FIG. 7 and FIG. 8 illustrate a first aspect of a method of performing content pre-fetching is shown and is generally designated 700. Beginning at step 702, a web browser monitor 107 may maintain a web browsing history. The web browsing history may include data regarding all pages viewed by a user, the time each page was viewed by the user, the date each page was viewed, or a combination thereof. Then, the method 700 may proceed to block 802 of FIG. 8.

Moving to step 706, a system monitor 109 may determine a CPU/bus load, i.e., the current processor load. The CPU/bus load may be expressed as a processor speed, e.g., a processor frequency. Then, the method 700 may proceed to block 802 of FIG. 8. At step 708, the system monitor 109 may determine a battery status. The battery status may indicate the remaining battery life, the remaining charge, or a combination thereof. After the battery status is determined, the method 700 may continue to block 802 of FIG. 8.

At step 712, a high speed packet access (HSPA) system 177, described above in connection with FIG. 3B, may determine the presence of a channel (i.e. if a channel is available) as well as a channel quality indicator (CQI). In a particular aspect, the CQI may be a measurement of the communication quality of a wireless channel The CQI may be a value that represents a measure of a channel quality for a given wireless channel. A CQI having a relatively high value may indicate that a particular channel has a relatively high quality. Conversely, a CQI having a relatively low value may indicate that a particular channel has a relatively low quality.

A CQI for a channel may be computed using a performance metric, such as a signal-to-noise ratio (SNR), a signal-to-interference plus noise ratio (SINR), a signal-to-noise plus distortion ratio (SNDR), or a combination thereof. These values may be measured for a particular channel and then, used to compute a CQI for the channel The CQI for each channel may then be averaged to determine a $CQI_{AVG}$ value. Following the determination of the CQI, the method 700 may proceed to block 802 of FIG. 8.

Moving to step 716, the HSPA system 177 may determine a common pilot channel signal-to-noise ratio (CPICH SNR). It may be appreciated that the CPICH is a downlink in a PCD 100 that may be broadcast with a constant power and of a known bit sequence. After the CPICH SNR is determined the method 700 may proceed to block 802 of FIG. 8.

At step 718, a GPS 143 may monitor, or otherwise determine, a vertical speed associated with a portable computing device (PCD) 100. At step 722, the GPS 143 may determine a horizontal speed associated with the PCD 100. Thereafter, at step 724, the GPS 143 may output the vertical speed to the web browser 382. Further, at step 728, the GPS 143 may output the GPS horizontal speed to the web browser application 382.

Continuing to block 730, the web browser application 726 may determine a mobile speed. The mobile speed may be determined using the following formula:

$$\text{Mobile Speed} = \sqrt{(\text{vertspeed}^2 + \text{horzspeed}^2)}$$

where, vertspeed is the vertical speed determined by GPS 143 at step 718; and horzspeed is the horizontal speed determined by GPS 143 at step 722. From block 703, the method 700 may proceed to block 802 of FIG. 8.

At block 802 of FIG. 8, a current time may be determined. At decision block 804, the pre-fetch module 384 may determine whether there are any common websites that are typically accessed within a predetermined time, e.g., ten minutes, from the current time. In doing this, the pre-fetch module 384 may determine a pattern of use based on operator of the PCD 100. The pre-fetch module 384 may make this determination based on the web browser history maintained and monitored by the web browser monitor 107 in Step 702 discussed above. If there are not any common websites that are typically accessed ten minutes from the current time, the method 700 may proceed to block 806 and the pre-fetch routine may be exited by the browser application 382 working in concert with the pre-fetch module 384. On the other hand, if there are common websites that are typically accessed ten minutes from the current time, the pre-fetch module 384 may proceed to decision block 808.

At decision block 808, the pre-fetch module 384 may determine whether the CPU/bus load, determined above at step 706 by the system monitor 109, satisfies a CPU/bus load condition. For example, the CPU/bus load condition may be a frequency value threshold and if the CPU/bus load is less than the frequency value threshold, the CPU/bus load may satisfy the CPU/bus load condition. If the CPU/bus load is not less than the threshold, the method 700 executed by the pre-fetch module 384 may proceed to block 806 and the web browser application 382 may exit the pre-fetch routine 700 executed by the pre-fetch module 384.

Conversely, at decision block 808, if the CPU/bus load is less than the threshold, the method 700 may proceed to decision block 810 and the pre-fetch module 384 may determine whether a PCD 100 is connected to a charger. If the PCD 100 is not connected to a charger the method 700 may proceed to decision block 812 and the pre-fetch module 384 may determine whether the battery status, determined at step 710 by the system monitor 109 satisfies a battery condition. In a particular aspect, the battery status is a battery life and the battery condition may be a battery life threshold. The battery life may satisfy the battery condition is the battery life is greater than the battery life threshold.

If the battery life is not greater than the threshold, the method 700 may proceed to block 806 and the web browser application may exit the pre-fetch routine. If the battery life is greater than the threshold, the method 700 may proceed to decision block 814. Returning to decision block 810, if the PCD 100 is connected to a charger, the method 700 may also continue to decision block 814.

At decision block 814, the pre-fetch module 384 may determine whether an average CQI, determined at step 712 by the HSPA system 177, satisfies a CQI condition or whether the CPICH SNR, determined at step 716 by the HSPA system 177, satisfies a CPICH SNR condition. Alternatively or in addition, in this block 814, the pre-fetch module 384 may also determine if a channel exists or is available.

The CQI condition may be a threshold value and the average CQI may satisfy the CQI condition if the average CQI is greater than the threshold. In a particular aspect, the threshold value may be about twenty (20). A CQI of this value may guarantee at least achieving a data rate on the order of several Mega bits per second. The CPICH SNR condition may also be a threshold value and if the CPICH SNR is greater than the threshold value, then the CPICH SNR may satisfy the condition. For example, if the CPICH SNR is greater than or equal to minus 10 decibels, then this condition may allow for pre-fetching to occur without difficulty for a wireless PCD 100.

At decision block 814, if the average CQI is not greater than the threshold or the CPICH SNR is not greater than the threshold, the method 700 may proceed to block 806 and the web browser application 382 may exit the pre-fetch routine executed by the pre-fetch module 384. At decision block 814, if the average CQI is greater than the threshold or the CPICH SNR is greater than the threshold, the method 700 may proceed to decision block 816.

At decision block 816, the pre-fetch module 384 may determine whether the mobile speed, determined at step 730, satisfies a speed condition. For example, the speed condition may be a speed threshold and the mobile speed may satisfy the condition if the mobile speed is less than the speed threshold. The speed threshold may a value below which it may be assumed that a radio signal is relatively stable, for example, the speed threshold may be three miles per hour (3 mph).

At decision block 816, if the mobile speed is not less than the speed threshold, the method 700 may move to block 806 and the web browser application 382 may exit the pre-fetch routine executed by the pre-fetch module 384. Otherwise, if the mobile speed is below the speed threshold, the method 700 may continue to block 818 and the pre-fetch module 384 may perform the content pre-fetching. Thereafter, the method 700 may end.

Figure 9:
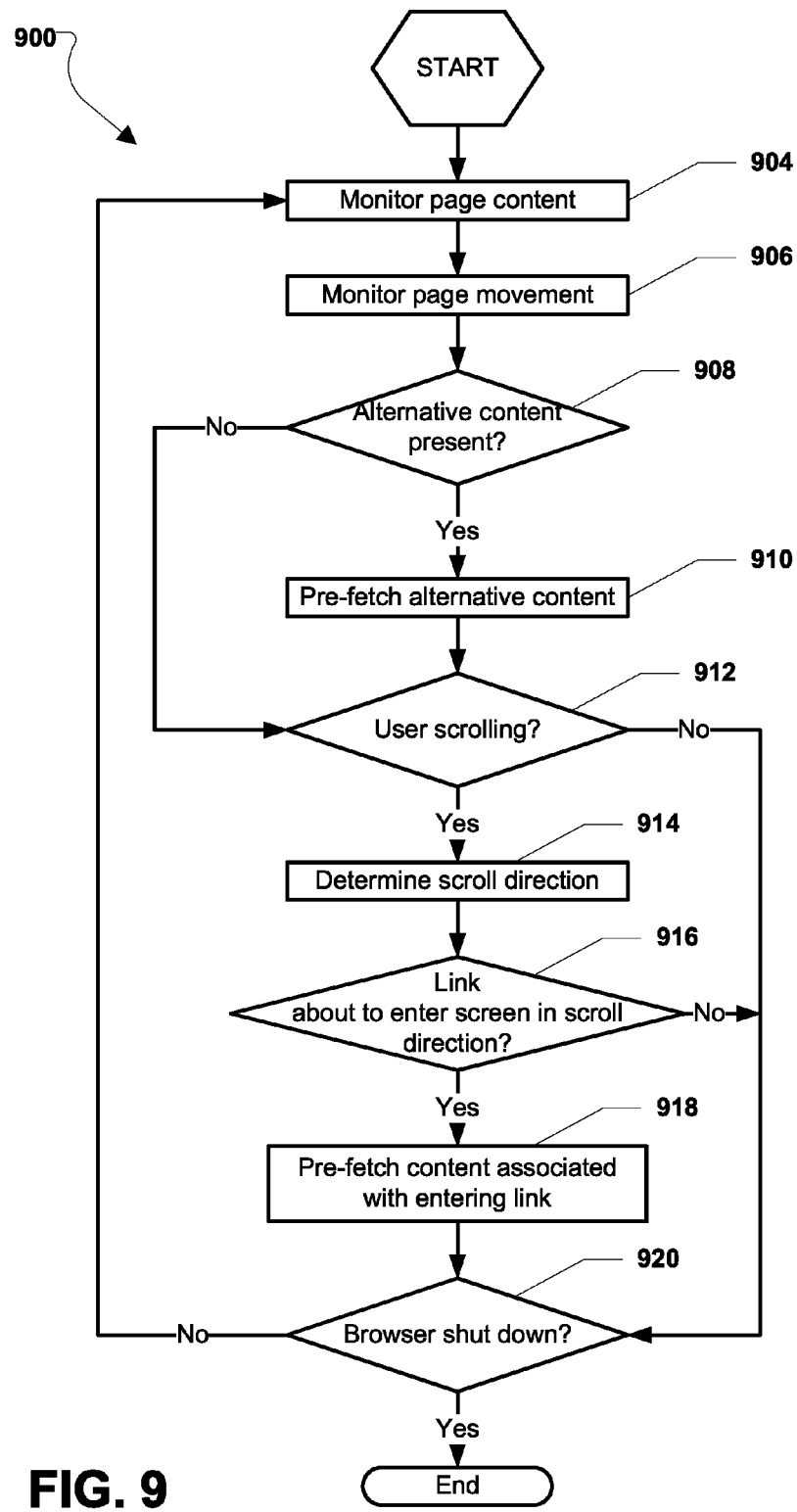
FIG. 9 is a flowchart illustrating a second aspect of a method of performing content pre-fetching.

Referring to now to FIG. 9, a second aspect of a method of performing content pre-fetching by the pre-fetch module 384 is shown and is generally designated 900. Commencing at block 904, the pre-fetch module 384 may monitor the page content associated with a current page loaded by the web browser application 382. At block 906, the pre-fetch module 384 may monitor page movement.

Moving to decision block 908, the pre-fetch module 384 may determine whether the current page content includes any alternative content beyond text and images, such as multimedia files like videos and audio. If the current page content includes alternative content, the method 900 may proceed to block 910 and the pre-fetch module 384 may pre-fetch alternative content. In such a case, with the alternative content pre-fetch, if a user clicks on the alternative content, the alternative content, such as a video or audio file may be displayed/played with relatively little delay and may enhance the user experience by reducing wait time associated with normal fetching of content within a wireless environment. From block 910, the method 900 may proceed to decision block 912. Returning to decision block 908, if the current content does not include any alternative content, the method 900 may proceed directly to decision block 912.

At decision block 912, the pre-fetch module 384 may determine whether a user is changing the screen content for the current web page. If not, the method 900 may proceed to decision block 914 and it may be determined whether the web browser application 382 is shut down. If so, the method 900 may end. On the other hand, if the web browser application 382 is not shut down, the method 900 may return to block 904 and the method 900 may continue as described herein.

Returning to decision block 912, if the user is changing screen content, then method 900 may continue to block 916 and the pre-fetch module 384 may determine a scroll direction. Then, at decision block 918, the pre-fetch module 384 may determine whether a link is about to enter the display screen in the scroll direction. If no links are about to enter the display screen, the method 900 may proceed to decision block 914 and the method 900 may continue as described herein.

At decision block 918, if one or more links, are about to enter the screen 108 in the scroll direction, the method 900 may proceed to block 920 and the pre-fetch module 384 may pre-fetch the content associated with each entering link Accordingly, if a user clicks on a newly entered link, content associated with that link may be presented to the user with little hesitation or substantially reduced wait time compared to normal fetching within a wireless network. From block 920, the method 900 may proceed to decision block 914. Thereafter, the method 900 may continue as described.

Figure 10:
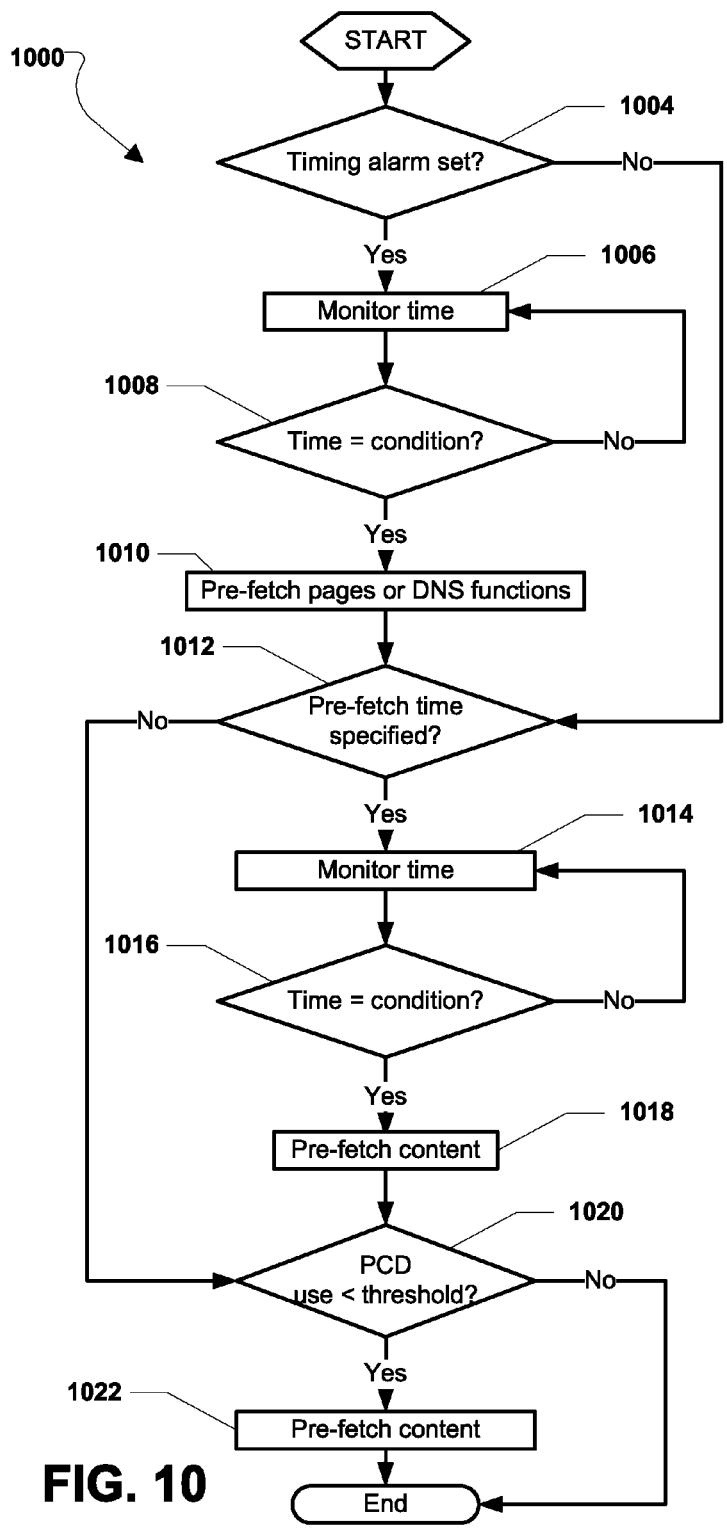
FIG. 10 is a flowchart illustrating a third aspect of a method of performing content pre-fetching.

FIG. 10 depicts a third aspect of performing content pre-fetching, generally designated 1000. Beginning at block 1004, the pre-fetch module 384 may determine whether a timing alarm has been set. If the timing alarm is set, the method 1000 may proceed to block 1006 and the pre-fetch module 384 may monitor the time. Then, at decision block 1008, the pre-fetch module 384 may determine whether the current time satisfies a time condition. For example, the time condition may be an alarm time minus a predetermined amount of time, e.g., five minutes, ten minutes, fifteen minutes, etc. If the time equals the alarm time minus the predetermined amount of time, then the current time may satisfy the time condition.

If the time does not equal the alarm time minus the predetermined amount of time, the method 1000 may return to block 1006 and the method 1000 may continue as described herein. Otherwise, if the time is equal to the alarm time minus the predetermined time, the method 1000 may continue to block 1010.

At block 1010, the pre-fetch module 384 of the web browser 382 may pre-fetch one or more pages. The pages may be determined based on a user selection, based on a web browser history, bookmarks, or a combination thereof. Accordingly, if a user has set the device alarm for 8 a.m., at 7:45 am, the pre-fetch module 384 may begin performing content pre-fetching, DNS pre-fetching, or a combination thereof. Then, after the alarm sounds, the user wakes, and grabs the device, content may be readily available for viewing.

From block 1010, the method 1000 may continue to decision block 1012. Returning to decision block 1004 if the device alarm is not set, the method 1000 may also move to decision block 1012. At decision block 1012, the pre-fetch module 384 may determine whether a pre-fetch time is specified, e.g., a user determined time, or system determined time (e.g., based on history), or a combination thereof. A pre-fetch time may be a specific time at which the web browser application may begin performing content pre-fetching, DNS pre-fetching, or a combination thereof.

If a pre-fetch time is specified, the method 1000 may proceed to block 1014 and the web browser application may monitor the time. Thereafter, at decision block 1016, the pre-fetch module 384 may determine whether the time satisfies a condition. The condition may be the specified pre-fetch time and the time may satisfy the condition when the time is equal to the specified pre-fetch time. If the time is not equal to the specified pre-fetch time, the method 1000 may return to block 1014 and the method 1000 may continue as described. Otherwise, the method 1000 may proceed to block 1018 and the web browser application may pre-fetch content. Thereafter, the method 1000 may continue to decision block 1020.

Returning to decision block 1012, if a pre-fetch time is not specified, the method 1000 may also proceed to decision block 1020. At decision block 1020, the pre-fetch module 384 may determine whether a PCD use satisfies a device use condition. The device use condition may be a use threshold and if the PCD use falls below the threshold the condition may be satisfied. If the device use does not fall below the use threshold, the method 1000 may end. Otherwise, if the device use is less than the use threshold, the method 1000 may move to block 1022 and the pre-fetch module 384 may pre-fetch content. Accordingly, when a PCD 100 is in a low use mode, e.g., at night while a user is asleep and before the user wants to go to a desired web page displayable on the PCD 100, the pre-fetch module 384 may perform DNS pre-fetching, content pre-fetching, or a combination thereof. After block 1022, the method 1000 may end.

Figure 11:
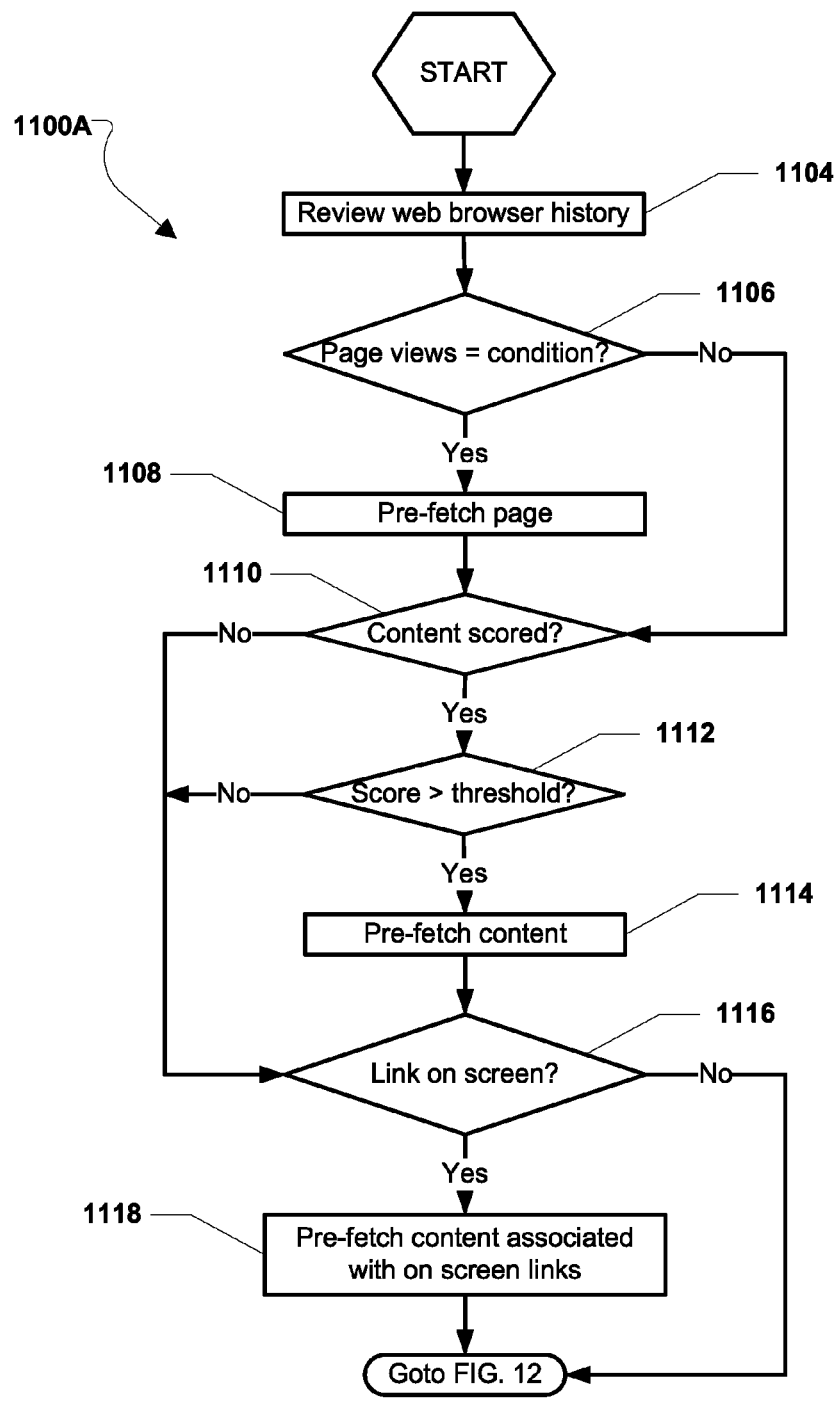
FIG. 11 is a first portion of a flowchart illustrating a fourth aspect of a method of performing content pre-fetching.
Figure 12:
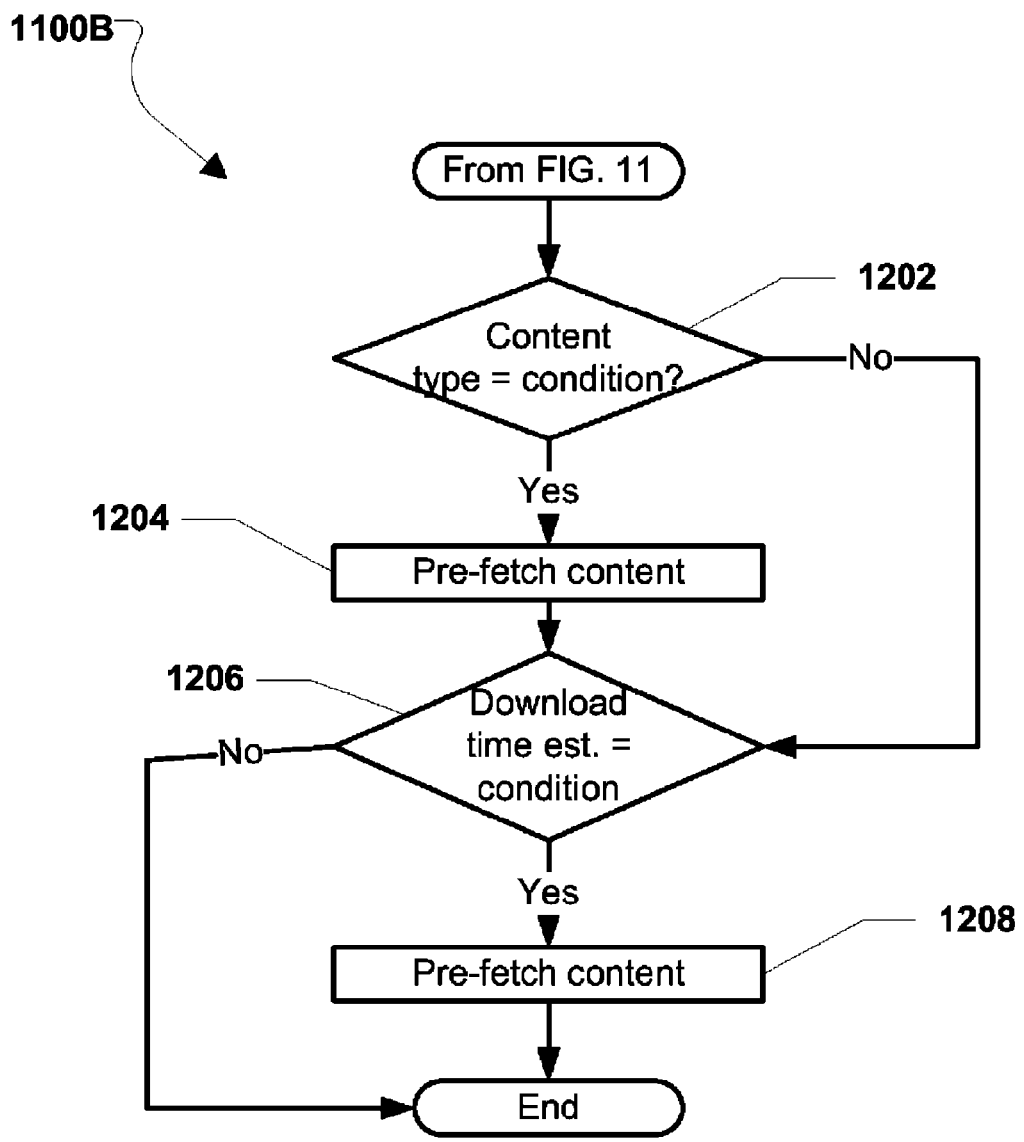
FIG. 12 is a second portion of the flowchart illustrating a fourth aspect of a method of performing content pre-fetching.

FIG. 11 and FIG. 12 show a fourth aspect of performing content pre-fetching, generally designated 1100. Beginning at block 1104, when a PCD 100 which has web browser application 382 is powered on, the pre-fetch module 384 may review a web browser history. At block 1106, the pre-fetch module 384 may determine whether any page views, i.e., a number of views for any page, satisfies a page view condition. The page view condition may be a user specified, or system specified, number of page views and if the page views is greater than the number of page views, the page views may satisfy the page view condition. For example, if the page views for a particular page are greater than ten (10), the condition may be satisfied.

If the page views satisfy the page view condition, the method 1100 may proceed to block 1108 and the pre-fetch module 384 may pre-fetch any pages having page views that satisfy the page view condition. Then, the method 1100 may proceed to decision block 1110. Returning to decision block 1106, if the page views do not satisfy the page view condition, the method 1100 may also proceed to decision block 1110.

At decision block 1110, the pre-fetch module 384 may determine whether any web page content is scored. The content may be scored by the host of the content, the creator of the content, an objective scoring body, or a combination thereof. The score associated with the content may indicate that the content should be pre-fetched. If any content is scored, the method 1100 may proceed to decision block 1112 and the pre-fetch module 384 may determine whether any content score satisfies a score condition. The content score may be a user selected score and the content score may satisfy the condition when the content score is greater than the user selected score. For example, a user may specify that all content having a score of seven (7) or greater should be pre-fetched by the pre-fetch module 384.

At decision block 1112, if the score of any content is greater than the threshold, the method 1100 may proceed to block 1114 and the pre-fetch module 384 may pre-fetch any content having a score that is greater than the threshold. Thereafter, the method may proceed to decision block 1116. Returning to decision block 1110, if no content is scored, the method 1100 may also proceed to decision block 1116. Further, at decision block 1112, if no score satisfies the condition, the method 1100 may move to decision block 1116.

At decision block 1116, the pre-fetch module 384 may determine whether any links are on screen. If so, the pre-fetch module 384 may pre-fetch the content associated with the on screen links. Thereafter, the method may proceed to decision block 1202 of FIG. 12. Returning to decision block 1116, if there are not any links on screen, the method 1200 may also proceed to decision block 1202 of FIG. 12.

At decision block 1202 of FIG. 12, the pre-fetch module 384 may determine whether any content type on the current web page satisfies a content type condition. For example, the content type condition may be .jpeg, .mpeg, .mp3, .wav, .avi, .wmv, .mov, etc., and if the content type is the same as the content type condition, the content type may satisfy the condition. Accordingly, certain types of content that are not typically large in file size, may be pre-fetched. Other types of content that are relatively large, e.g., streaming content, .pdf, etc., may not be pre-fetched due to the large overhead associated therewith.

At decision block 1202, if the content type satisfies the content type condition, the method 1100 may proceed to block 1204 and the pre-fetch module 384 may pre-fetch the content that satisfies the content type condition. Thereafter, the method 1100 may proceed to decision block 1206. Returning to decision block 1202, if the content type does not satisfy the content type condition, the method 1100 may also proceed to decision block 1206.

At decision block 1206, the pre-fetch module 384 may determine whether an estimated download time is equal to a condition. In a particular aspect, the file size threshold for pre-fetching may be a function of the file size and maximum available data rate. For example, in decision block 1206, a desirable condition may include pre-fetching content that may be completed within a predetermined amount of time, such as a few seconds. Therefore, if the maximum available data rate is 28.8 Megabits per second (Mbps), the condition or threshold for decision block 1206 may be set as follows: 28.8 (maximum available data rate)×1 second (time)×75%

(weighting constant/factor)=2.7 Megabytes (maximum file size to download with pre-fetch module 384).

At decision block 1206, if any content size on the current web page satisfies the download time condition, the method 1100 may proceed to block 1208 and the content that satisfies the content size condition may be pre-fetched by the web browser application. Thereafter, the method 1100 may end. Returning to decision block 1206, if no content size equals the content size condition, the method 1100 may end.

Figure 13:
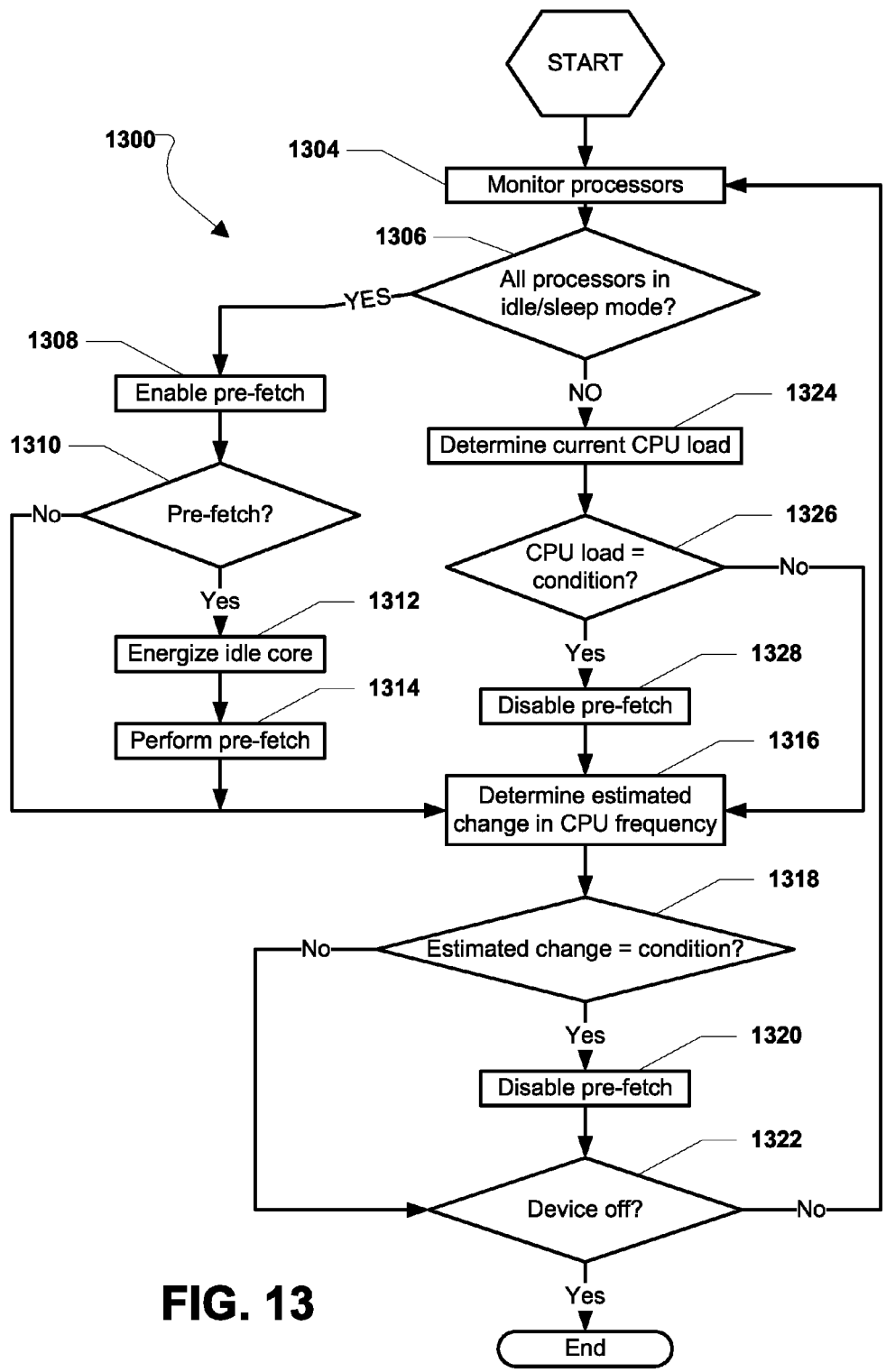
FIG. 13 is a flowchart illustrating a fifth aspect of a method of performing content pre-fetching.

Referring to FIG. 13, a fifth aspect of performing content pre-fetching is shown and is generally designated 1300. Beginning at block 1304, when a PCD 100 is powered on, the following steps may be performed. In a particular aspect, the PCD 100 may have a plurality of processors 324 therein or the PCD 100 may have a multi-core processor 324 therein. At block 1304, the pre-fetch module 384 may monitor a plurality of processors, or cores, in the PCD 100. At decision block 1306, the pre-fetch module 384 of the web browser application 382 may determine whether all processors, or cores, of DSP 324 are in an idle state or in a sleep mode. If the processors or cores are in a sleep state, the method 1300 may follow the "Yes" branch and proceed to block 1308 and the pre-fetch module 384 of the web browser application 382 may enable content pre-fetching.

Moving to decision block 1310, the pre-fetch module 384 may determine whether a pre-fetch condition exist, i.e., does the current web page include any content that is a candidate for pre-fetching, does the current time warrant the performance of content pre-fetching, does the current time warrant the performance of DNS pre-fetching, or a combination thereof. If a pre-fetch condition does exist, the method 1300 may proceed to block 1312 and the pre-fetch module 384 may energize an idle processor, or core of DSP 324, e.g., by sending a request to a system monitor 109 to energize the idle processor, or core of DSP 324.

Next, at block 1314, the pre-fetch module 384 may perform the pre-fetching operation using the idle processor, or core of DSP 324. The method may then proceed to block 1316. Returning to decision block 1310, if a pre-fetch condition does not exist, the method 1300 may proceed directly to block 1316. At block 1316, the pre-fetch module 384 may determine an estimated change in CPU frequency. In a particular aspect, the pre-fetch module 384 of the web browser application 382 may determine an estimated change in CPU frequency based on information received from the system monitor 109 which may include a scheduler or which monitors information received from one or more run queues, or a combination thereof.

Moving to decision block 1318, the pre-fetch module 384 may determine whether the estimated change in the CPU frequency is equal to a CPU frequency condition. For example, the CPU frequency condition may be a CPU frequency threshold and if the estimated change in the CPU frequency is greater than the CPU frequency threshold, the CPU frequency may satisfy the CPU frequency condition. If the estimated change in the CPU frequency satisfies the CPU frequency condition, the method 1300 may proceed to block 1320 and the pre-fetch module 384 may disable pre-fetch. The pre-fetch module 384 may disable pre-fetching in anticipation that the processors, or cores, may become too busy to perform the pre-fetching tasks, or operations.

From block 1320, the method 1300 may proceed to decision block 1322. Returning to decision block 1318, if the estimated change in the CPU frequency does not satisfy the CPU frequency condition, the method 1300 may also proceed to decision block 1322. At decision block 1322, the pre-fetch module 384 may determine whether the portable computing device 100 is powered off. If so, the method 1300 may end. Otherwise, if the portable computing device 100 is not powered off and remains on and operational, the method 1300 to block 1304 and the method 1300 may continue as described herein.

Returning to decision block 1306, if the pre-fetch module 384 determines that all processors are on and not in an idle state, the method 1300 may follow the "No" branch and proceed to block 1324. At block 1324, the pre-fetch module 384 may determine a current CPU load, e.g., the load on each processor, each core, or a combination thereof. The current CPU load may be determined based on information received from the system monitor 109. That information may include a current operating frequency. The load may be determined by dividing the current operating frequency by the maximum operating frequency for each processor, or core, in order to determine a percentage value.

Moving to decision block 1326, the pre-fetch module 384 may determine whether the CPU load satisfies a CPU load condition. For example, the CPU load condition may be a percentage use value and if the CPU load is greater than the percentage use value, the CPU load may satisfy the CPU load condition. At decision block 1326, if the CPU load does satisfy the CPU load condition, the method 1300 may continue to block 1328 and pre-fetching may be disabled. Accordingly, the web browser application may disable pre-fetching when the CPU load becomes too great to perform pre-fetching operations or tasks. It may be appreciated that in lieu of using the CPU load as a trigger for disabling pre-fetching, the pre-fetch module 384 may receive temperature information for each processor, or core, and if the temperature data indicates a high thermal condition, the pre-fetch module 384 may also disable pre-fetching.

From block 1328, the method 1300 may proceed to block 1316 and then, the method 1300 may continue as described herein. Further, from decision block 1326, if the CPU load does not satisfy the CPU load condition, the method 1300 may also proceed to block 1316 and continue as described.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device with a WWAN connection, a netbook computing device with a WWAN connection, a laptop computing device with a WWAN connection, a desktop computing device with a WWAN connection, or a combination thereof. Also, the various method steps may be combined in any order in order to create new methods not specified herein.

With the configuration described herein, the systems and methods herein may be used to perform DNS pre-fetching, content pre-fetching, or a combination thereof. Since DNS pre-fetching may place a substantial load on a mobile communication network, the DNS pre-fetching may be performed at times when a user is not using a device, e.g., before a user typically uses a device (based on a recorded use history), just before a alarm is set, when a pre-fetch alarm is triggered, when a device is in a low use mode, or a combination thereof as discussed above in connection with FIG. 10.

Further, content pre-fetching may be performed using unused, or underused, network resources, rendering resources, or a combination thereof. Pre-fetching content may provide better quality of service and may substantially enhance a user experience by retrieving content that a user might want to see before the content is actually requested by the user. For example, the system may pre-fetch frequently visited pages, links most likely to be clicked on by a user (based on score, etc.), or a combination thereof as described above in connection with FIG. 11.

The system may use conditional content, scheduled content, predicted content, or a combination thereof. For example, the conditional content may include preloading, i.e., pre-fetching, content that may be conditionally selected based on some event such as user input or time of day. The scheduled content may include preloading, or pre-fetching, content based on a time of day such as early every morning as described above in connection with FIG. 10. This may allow content to be made available shortly before it is requested by a user. The predicted content may include predicting and preloading content in advance of a user requesting as described above in connection with FIGS. 4 and 9. This may improve a user experience by providing better responsiveness.

It may be appreciated that various criteria may be used to determine what content should be candidates for pre-loading, including user history, server resource metrics, view and mouse proximity to a particular URL, and content type as described above in connection with FIGS. 4 and 9. Additionally, certain resource availability may be determined. Such resources may be determined using one or more power metrics, one or more radio link metrics, one or more CPU/bus metrics, or a combination thereof. The power metrics may include determining whether a device is being charged as described above in connection with FIG. 8. This may allow pre-fetching to be enabled or disabled based on the impact to device power consumption and whether the device is near its thermal limit as describe above in connection with FIG. 13. The radio link metrics may include a block error rate (BLER), a signal to noise ratio (SNR), a throughput (TP) being achieved, a round trip time (RTT), or a combination thereof as described above in connection with FIG. 8.

It may be appreciated that the BLER may be a number incorrectly transferred data packets divided by a number of transferred packets. The SNR may be a ratio of a signal power to a noise power that may be corrupting the signal. The throughput may be an average rate of successful message delivery over a communication channel The throughput may be measured in bits per second (bit/s or bps). The RTT may be a time required for a signal pulse or packet to travel from a specific source to a specific destination and back again. The radio metrics may be used to determine the overall quality and capacity of one or more channels. Other queued network tasks such as voice traffic can be used to determine the near term client demand for the resource.

The CPU/bus metrics may include a current CPU load. The current CPU load may be expressed as a frequency value. Alternatively, the current CPU load may be expressed as a percentage value, e.g., a current frequency divided by a maximum frequency. Using the CPU/bus metrics as a condition may allow pre-fetching to be disabled when it would have an adverse impact on a system performance as described above in connection with FIG. 13.

In one or more exemplary aspects, the functions described may be implemented in hardware, software, firmware, or any combination thereof. If implemented in software, the functions may be stored on or transmitted over as one or more instructions or code on a computer program product such as a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for performing Domain Name Server (DNS) pre-fetching of information for a portable computing device, the method comprising:
   rendering a web page on a display screen of the portable computing device;
   detecting links on the rendered web page;
   determining whether a screen changing operation is being performed, wherein the screen changing operation is selected from the group consisting of scrolling, panning, zooming, and combinations thereof;
   performing a DNS pre-fetch for any visible links within the web page;
   placing one or more DNS pre-fetch tasks in a queue within the portable computing device for each visible link on the display screen when the screen changing operation is performed;
   determining if the screen changing operation is stopped; and
   executing the DNS pre-fetch task for visible links in the web page when the screen changing operation is stopped.

2. The method of claim 1, further comprising:
   determining if a wireless channel exists.

3. The method of claim 1, wherein the queue is a last-in first-out queue.

4. The method of claim 3, further comprising:
   clearing the queue in response to a user navigating away from the webpage.

5. The method of claim 1, further comprising:
   determining a likelihood that a user will download one or more websites by monitoring user habits and comparing habits to current time; and
   determining a pattern with respect to websites that are routinely accessed within a predetermined time from the current time.

6. The method of claim 5, further comprising:
   determining whether sufficient processing resources, including CPU, memory and bus bandwidth are available to support the processing of web content with a resource manager.

7. The method of claim 6, further comprising:
determining whether the portable computing device is connected to a charger or if sufficient battery charge is available, and if the processing resources are sufficient for processing web content.

8. The method of claim 7, further comprising:
determining whether an average wireless channel quality satisfies a condition when
the portable computing device is connected to the charger or has sufficient battery charge available; and
performing content or DNS pre-fetching when the average wireless channel quality satisfies the condition.

9. A portable computing device for performing Domain Name Server (DNS) pre-fetching of information, comprising:
means for rendering a web page on a display screen of the portable computing device;
means for detecting links on the rendered web page;
means for determining whether a screen changing operation is performed, wherein the screen changing operation is selected from the group consisting of scrolling, panning, zooming, and combinations thereof;
means for performing a DNS pre-fetch for any visible links within the web page;
means for placing one or more DNS pre-fetch tasks in a queue for each visible link that on the display screen when the screen changing operation is performed;
means for determining if the screen changing operation is stopped; and
means for executing the DNS pre-fetch task for each visible link in the web page when the screen changing operation is stopped.

10. The portable computing device of claim 9, further comprising: means for determining if a wireless channel exists.

11. The portable computing device of claim 9, wherein the queue is a last in first out queue.

12. The portable computing device of claim 11, further comprising:
means for clearing the queue in response to a user navigating away from the webpage.

13. The portable computing device of claim 9, further comprising:
means for determining a likelihood that a user will download one or more websites by monitoring user habits and comparing habits to current time; and
means for determining a pattern with respect to websites that are routinely accessed within a predetermined time from the current time.

14. The portable computing device of claim 13, further comprising:
means for determining whether sufficient processing resources, including CPU, memory and bus bandwidth are available to support the processing of web content with a resource manager.

15. The portable computing device of claim 14, further comprising:
means for determining whether the portable computing device is connected to a charger or if sufficient battery charge is available, and if the processing resources are sufficient for processing web content.

16. The portable computing device of claim 15, further comprising:
means for determining whether an average wireless channel quality satisfies a condition when the portable computing device is connected to the charger or has sufficient battery charge available; and
means for performing content or DNS pre-fetching when the average wireless channel quality satisfies the condition.

17. A portable computing device for performing Domain Name Server (DNS) pre-fetching of information, comprising:
a memory;
a processor accessible to the memory, wherein the processor is configured with processor-executable instructions to perform operations comprising:
rendering a web page on a display screen of the portable computing device;
detecting links on the rendered web page;
determining whether a screen changing operation is performed, wherein the screen changing operation is selected from the group consisting of scrolling, panning, zooming, and combinations thereof;
performing a DNS pre-fetch for any visible links within the web page;
placing one or more DNS pre-fetch tasks in a queue within the portable computing device for each visible link on the display screen when the screen changing operation is performed;
determining if the screen changing operation is stopped; and
executing the DNS pre-fetch task for visible links in the web page when the screen changing operation is stopped.

18. The portable computing device of claim 17, wherein the processor is configured with processor-executable instructions to perform operations further comprising:
determining if a wireless channel exists.

19. The portable computing device of claim 17, wherein the queue is a last in first out queue.

20. The portable computing device of claim 19, wherein the processor is configured with processor-executable instructions to perform operations further comprising:
clearing the queue in response to a user navigating away from the webpage.

21. The portable computing device of claim 17, wherein the processor is configured with processor-executable instructions to perform operations further comprising:
determining a likelihood that a user will download one or more websites, by monitoring user habits and comparing habits to current time; and
determining a pattern with respect to websites that are routinely accessed within a predetermined time from the current time.

22. The portable computing device of claim 21, wherein the processor is configured with processor-executable instructions to perform operations further comprising:
determining whether sufficient processing resources, including CPU, memory and bus bandwidth are available to support the processing of web content with a resource manager.

23. The portable computing device of claim 22, wherein the processor is configured with processor-executable instructions to perform operations further comprising:
determining whether the portable computing device is connected to a charger or if sufficient battery charge is available, and if the processing resources are sufficient for processing web content.

24. The portable computing device of claim 23, wherein the processor is configured with processor-executable instructions to perform operations further comprising:

determining whether an average wireless channel quality satisfies a condition when the portable computing device is connected to the charger or has sufficient battery charge available; and performing content or DNS pre-fetching when the average wireless channel quality satisfies the condition.

25. A non-transitory computer readable storage medium having stored thereon processor-executable instructions configured to cause a processor of a portable computing device to perform Domain Name Server (DNS) pre-fetching operations comprising:

rendering a web page on a display screen of the portable computing device;

detecting links on the rendered web page;

determining whether a screen changing operation is being performed, wherein the screen changing operation is selected from the group consisting of scrolling, panning, zooming, and combinations thereof;

performing a DNS pre-fetch for any visible links within the web page;

placing one or more DNS pre-fetch tasks in a queue within the portable computing device for each visible link on the display screen when the screen changing operation is performed;

determining if the screen changing operation is stopped; and executing the DNS pre-fetch task for visible links in the web page when the screen changing operation is stopped.

26. The non-transitory computer readable storage medium of claim 25, wherein the stored processor-executable instructions are configured to cause the processor of the mobile computing device to perform operations further comprising:

determining if a wireless channel exists.

27. The non-transitory computer readable storage medium of claim 25, wherein the queue is a last in first out queue.

28. The non-transitory computer readable storage medium of claim 27, wherein the stored processor-executable instructions are configured to cause the processor of the mobile computing device to perform operations further comprising:

clearing the queue in response to a user navigating away from the webpage.

29. The non-transitory computer readable storage medium of claim 25, wherein the stored processor-executable instructions are configured to cause the processor of the mobile computing device to perform operations further comprising:

determining a likelihood that a user will download one or more websites by monitoring user habits and comparing habits to current time; and determining a pattern with respect to websites that are routinely accessed within a predetermined time from the current time.

30. The non-transitory computer readable storage medium of claim 29, wherein the stored processor-executable instructions are configured to cause the processor of the mobile computing device to perform operations further comprising:

determining whether sufficient processing resources, including CPU, memory and bus bandwidth are available to support the processing of web content with a resource manager.

31. The non-transitory computer readable storage medium of claim 30, wherein the stored processor-executable instructions are configured to cause the processor of the mobile computing device to perform operations further comprising:

determining whether the portable computing device is connected to a charger or if sufficient battery charge is available, and if the processing resources are sufficient for processing web content.

32. The non-transitory computer readable storage medium of claim 31, wherein the stored processor-executable instructions are configured to cause the processor of the mobile computing device to perform operations further comprising:

determining whether an average wireless channel quality satisfies a condition when the portable computing device is connected to the charger or has sufficient battery charge available; and performing content or DNS pre-fetching when the average wireless channel quality satisfies the condition.

* * * * *